(12) United States Patent
Pollard et al.

(10) Patent No.: US 11,002,491 B2
(45) Date of Patent: May 11, 2021

(54) HEAT TRANSFER SEGMENT

(71) Applicant: HS Marston Aerospace Limited, Wolverhampton (GB)

(72) Inventors: Berwyn Pollard, Wolverhampton (GB); Paul Phillips, Bromsgrove (GB)

(73) Assignee: HS MARSTON AEROSPACE LIMITED, Wolverhampton (GB)

(*) Notice: Subject to any disclaimer, the term of this patent is extended or adjusted under 35 U.S.C. 154(b) by 44 days.

(21) Appl. No.: 15/879,616

(22) Filed: Jan. 25, 2018

(65) Prior Publication Data
US 2018/0238630 A1    Aug. 23, 2018

(30) Foreign Application Priority Data
Feb. 17, 2017    (EP) .................................... 17156760

(51) Int. Cl.
| | | |
|---|---|---|
| *F28D 9/00* | (2006.01) | |
| *B23P 15/26* | (2006.01) | |
| *F28F 3/02* | (2006.01) | |
| *F02C 7/12* | (2006.01) | |
| *F28F 9/26* | (2006.01) | |

(Continued)

(52) U.S. Cl.
CPC ............ *F28D 9/0062* (2013.01); *B23P 15/26* (2013.01); *F02C 7/12* (2013.01); *F28D 1/0426* (2013.01);
(Continued)

(58) Field of Classification Search
CPC .... F28D 9/0062; F28D 9/0068; F28D 9/0012; F28D 9/02; F28D 2001/0266;
(Continued)

(56) References Cited

U.S. PATENT DOCUMENTS 2,984,456 A * 5/1961 Young ..................... F28F 9/262
                                                 165/145
3,262,496 A * 7/1966 Bawabe ............... F28D 9/0068
                                                 165/166

(Continued)

FOREIGN PATENT DOCUMENTS

FR    2932425 A3 * 12/2009 ............. B60K 11/04
GB    898822 A * 6/1962 ............... F28B 1/06

(Continued)

OTHER PUBLICATIONS

Extended European Search Report for International Application No. 17156760.5 dated Sep. 22, 2017, 6 pages.

*Primary Examiner* — Joel M Attey
*Assistant Examiner* — For K Ling
(74) *Attorney, Agent, or Firm* — Cantor Colburn LLP

(57) ABSTRACT

A heat transfer segment for a curved heat exchanger, wherein the heat transfer segment comprises a plurality of enclosure bars that at least partially define two opposite ends of the heat transfer segment, wherein the two opposite ends define respective general planes, characterised in that: the enclosure bars are shaped and arranged such that the general plane of one end of the heat transfer segment is not parallel with the general plane of the other end of the heat transfer segment, such that when said heat transfer segment is joined to an adjacent heat transfer segment in an end-to-end fashion the enclosure bars the heat transfer segment may join to corresponding enclosure bars of the adjacent heat transfer segment.

13 Claims, 7 Drawing Sheets

(51) Int. Cl.
*F28D 1/04* (2006.01)
*F28D 21/00* (2006.01)

(52) U.S. Cl.
CPC ............ *F28D 9/0093* (2013.01); *F28F 3/025* (2013.01); *F28F 9/26* (2013.01); *F28D 2021/0021* (2013.01); *F28D 2021/0026* (2013.01); *F28F 2275/02* (2013.01)

(58) Field of Classification Search
CPC .... F28D 7/0058; F28D 7/1615; F28D 7/1623; F28D 7/1638; F28D 7/1646; F28D 7/1661; F28D 7/1676; F28D 7/1692; F28D 1/0426; F28D 1/0471; F28D 1/05358; F28D 1/05366; F28D 1/05308; F28D 2001/0243; F28D 7/1669; F28D 7/163; F28D 7/0066; F28D 7/005; F28D 7/10; F28D 7/0083; F28D 7/0091; F28D 9/0093; F28F 9/0246; F28F 9/0248; F28F 9/262; F28F 9/268; F28F 9/264; F28F 9/26; F28F 2275/04; F28F 2250/102; F28F 9/02; F28F 9/08; F28F 9/0224; F28F 9/182; F28F 2009/0285; F28F 2009/029; F28F 2230/00; F28F 2235/00; F28F 2240/00; F02C 7/224; F16L 3/085
USPC ................ 165/150, 151, 143, 158, 166, 173
See application file for complete search history.

(56) References Cited

U.S. PATENT DOCUMENTS

| | | | | |
|---|---|---|---|---|
| 3,981,354 A | * | 9/1976 | Haberski | ............... F28D 1/0471 165/79 |
| 4,206,807 A | * | 6/1980 | Koizumi | ............. F28D 15/0275 165/104.21 |
| 4,582,126 A | * | 4/1986 | Corey | .................... F02F 7/0087 165/82 |
| 4,616,695 A | * | 10/1986 | Takahashi | ............. F28D 9/0068 165/54 |
| 5,318,110 A | * | 6/1994 | Wei | .......................... F28D 7/08 165/145 |
| 5,909,767 A | * | 6/1999 | Batt | .......................... F28F 9/26 165/144 |
| 7,111,673 B2 | * | 9/2006 | Hugill | ...................... B01D 3/14 165/166 |
| 7,462,262 B2 | * | 12/2008 | Hino | ........................ B01D 1/06 159/27.1 |
| 8,393,860 B2 | * | 3/2013 | Czechowski | ........... F04D 17/12 165/163 |
| 8,474,515 B2 | | 7/2013 | Burgers et al. | |
| 8,516,791 B2 | * | 8/2013 | Perveiler | .................... F02C 7/14 60/226.1 |
| 9,593,647 B2 | * | 3/2017 | Demots | .................. F02M 31/20 |
| 2014/0034273 A1 | * | 2/2014 | Shi | ............................ F28B 1/06 165/114 |
| 2015/0260459 A1 | | 9/2015 | Cameron | |
| 2016/0123230 A1 | | 5/2016 | Thomas | |

FOREIGN PATENT DOCUMENTS

| | | | | | |
|---|---|---|---|---|---|
| GB | 2065860 A | * | 7/1981 | ................ | F28B 1/06 |
| GB | 2513117 A | * | 10/2014 | ............. | F24D 19/06 |
| GB | 2524059 A | | 9/2015 | | |
| JP | 60078296 A | * | 5/1985 | ............. | B62J 17/00 |
| JP | 2004162934 A | * | 6/2004 | | |
| WO | 2014201311 A1 | | 12/2014 | | |
| WO | 2015148657 A1 | | 10/2015 | | |

* cited by examiner

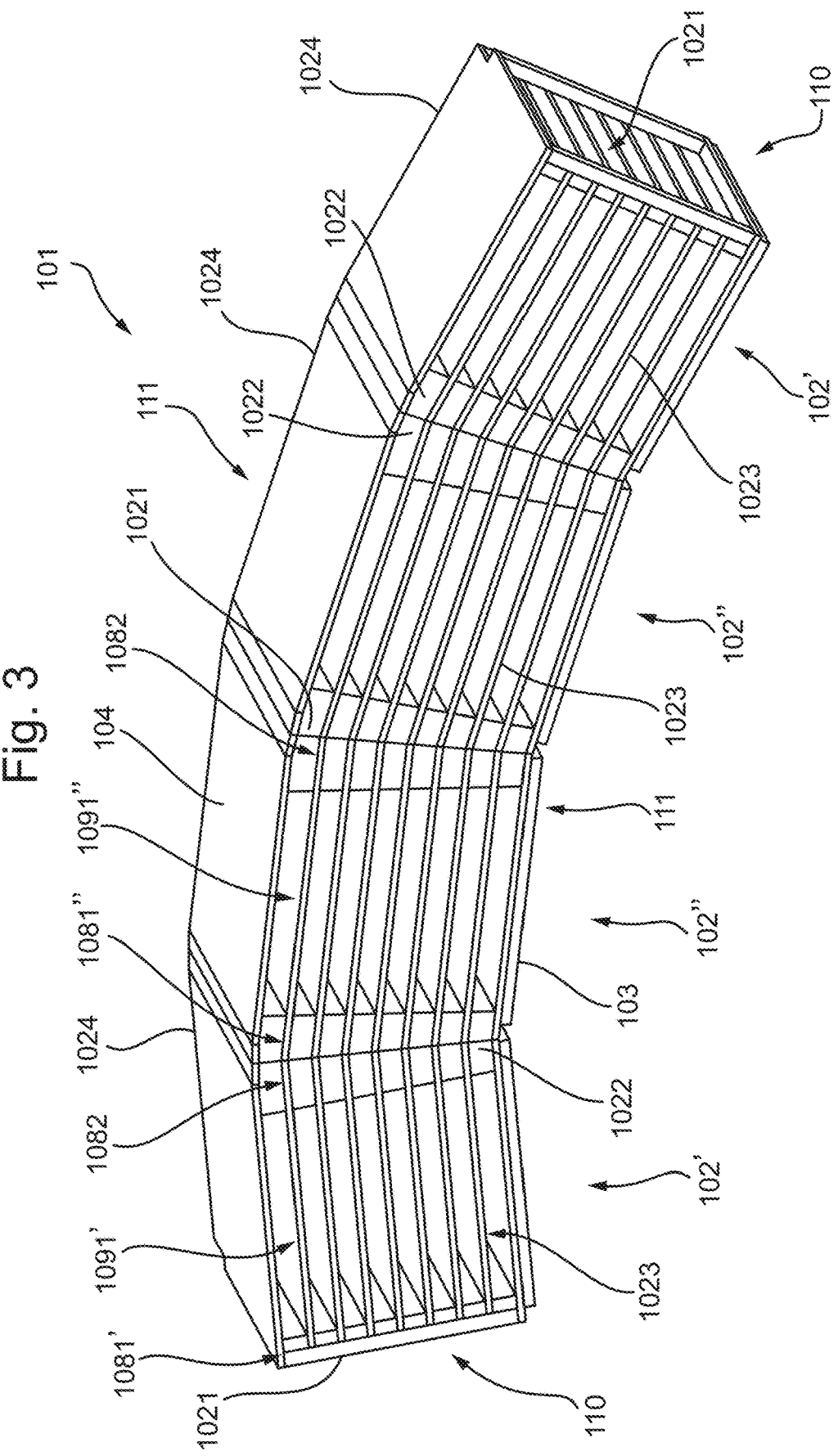

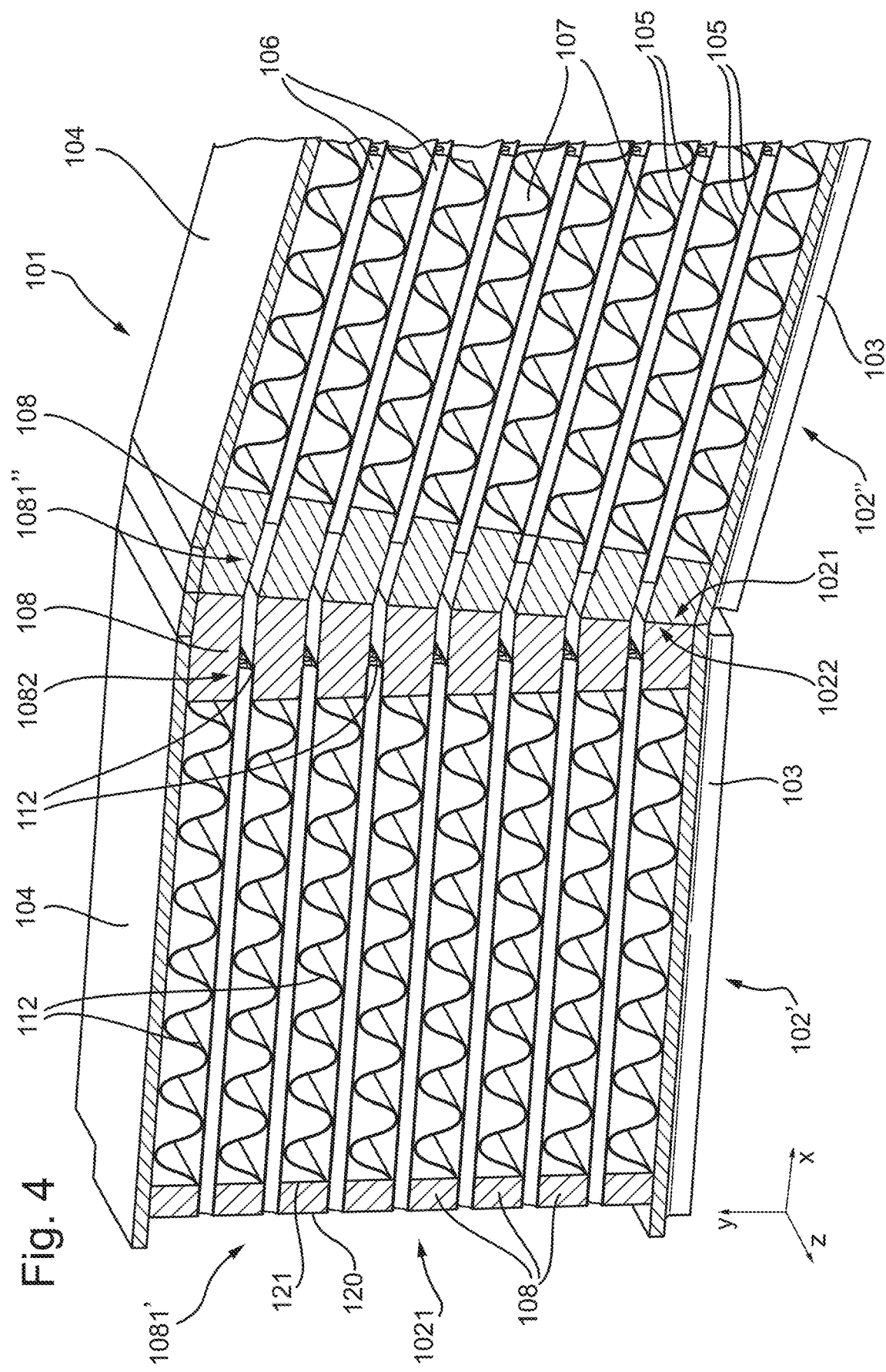

HEAT TRANSFER SEGMENT

FOREIGN PRIORITY

This application claims priority to European Patent Application No. 17156760.5 filed Feb. 17, 2017, the entire contents of which is incorporated herein by reference.

The present specification relates to a heat transfer segment for a curved heat exchanger, a curved heat exchanger and a method for manufacturing a curved heat exchanger.

In gas turbine engines, especially those used in aerospace applications, it is desirable to optimise the use of any available space, particularly where efficiency, volume reduction and weight reduction are primary considerations. In many cases, such as in an air-intake of an aircraft, the space available for a heat exchanger is curved.

An example of a prior art curved heat exchanger 1 is shown in FIGS. 1 and 2. FIG. 1 shows a perspective view of the curved heat exchanger 1 and FIG. 2 shows a cross-section of a portion of the curved heat exchanger 1.

The curved heat exchanger 1 is formed from a plurality of straight heat transfer segments 2 that are attached to one another in an end-to-end fashion and are angularly offset from one another such that the plurality of straight heat transfer segments 2 form a general curve of the curved heat exchanger 1.

Each segment 2 comprises a bottom plate 3 and a top plate 4. Between the bottom plate 3 and the top plate 4, a plurality of separating plates 5 are located. The separating plates 5 separate a first flow path 6 that extends in an end-to-end direction of the segment 2 from a second flow path 7 that extends across the segment 2. The bottom plate 3 is separated from the separating plates 5, the separating plates 5 are spaced from each other, and the top plate 4 is spaced from the separating plates 5 by enclosure bars 8, 9.

End enclosure bars 8 extend across the segment 2, from one side to the other, at each end of the segment 2. These enclosure bars 8, and the separating plates 7 that they attach to, define the second flow path 7.

Side enclosure bars 9 extend along the segment 2, from one end to the other, at each side of the segment 2. These enclosure bars 9, and the separating plates 7 that they attach to, define the first flow path 6.

Each segment 2 is a cuboid shape.

The ends 10 and sides 11 of the curved heat exchanger 1 may attach to manifolds (not shown) to introduce fluid into and/or receive fluid from the first and second flow paths 6, 7.

Between adjacent segments 2, side plates 12, top plates 4 and bottom plates 3 of the adjacent segments 2 are welded together. The top plate 4 comprises an extension plate 4' to extend the top plate 4 further from the end of the segment 2 than the bottom plate. This means that when the ends of the top plates 4 and bottom plates 2 of the adjacent segments are welded together the segments 2 are angularly offset from one another.

The side plates 12, top plates 4 and bottom plates 3 defines a wedge-shaped void 13 into which fluid from the first flow path 6 may enter from one segment 2 and exit into the other segment. The void 13 is sealed from the second flow path 7 due to the first set of enclosure bars 8.

In use, a fluid passes through the first flow path 6 of a first one of the segments 2 and enters the void 13. The fluid thus fills the void 13 and as it does so enters the first flow path 6 of the adjacent segment.

The inventors have identified that this void 13 reduces the pressure of the fluid passing through the first fluid paths 6 of the downstream segments 2 (i.e. the void 13 causes a pressure drop), which adversely affects the performance of the curved heat exchanger 1.

In a first aspect, the invention provides a heat transfer segment for a curved heat exchanger, wherein the heat transfer segment comprises a plurality of enclosure bars that at least partially define two opposite ends of the heat transfer segment, wherein the two opposite ends define respective general planes, characterised in that: the enclosure bars are shaped and arranged such that the general plane of one end of the heat transfer segment is not parallel with the general plane of the other end of the heat transfer segment, such that when said heat transfer segment is joined to an adjacent heat transfer segment in an end-to-end fashion the enclosure bars of the heat transfer segment may join to corresponding enclosure bars of the adjacent heat transfer segment thus forming an angular offset between the two adjacent heat transfer segments.

Having enclosure bars shaped in this way allows the enclosure bars of adjacent heat transfer segments to meet and to be joined together, and provides a curve to the heat transfer segments placed end-to-end. The adjacent heat transfer segments are preferably similar segments. The present heat transfer segment, when used in a curved heat exchanger, provides for a stronger and more efficient curved heat exchanger.

Joining enclosure bars together provides a strong join between the adjacent heat transfer segments. Enclosure bars are typically load-bearing elements of a heat transfer segment anyway. The inventors have devised that they can therefore provide a strong join between adjacent heat transfer segments.

In comparison, in the prior art discussed above, the adjacent segments are only held together by welding outer sheets (e.g. the top plates 4, the bottom plates 3 and the side plates 12) together. Since the present enclosure bars can be joined to adjacent enclosure bars by a joining process, such as brazing, the reliance on welding is reduced by the present invention. Therefore, because of the shape of the enclosure bars, fewer welds may therefore be required to attach the heat transfer segment to an adjacent segment. Welds can weaken a structure as they may introduce cracks and other defects.

Further, the shape of the enclosure bars allows a fluid path of the heat transfer segment (which is typically defined between adjacent enclosure bars) to meet a corresponding fluid path of an adjacent heat transfer segment. This means that pooling of fluid between adjacent heat transfer segments may be avoided, which increases the efficiency of the heat transfer segment.

It may be thought of that the enclosure bars of the present heat transfer segment (and possibly the separating plates and heat transfer elements (see below)) are shaped extended, in comparison to the prior art, such that they may meet corresponding enclosure bars (and possibly the separating plates and heat transfer elements (see below)) of an adjacent heat exchanger.

Said adjacent heat transfer segment may have corresponding enclosure bars similarly shaped to the enclosure bars defined above. The adjacent heat transfer segment may be similar or substantially identical to the present heat transfer segment. The end of said adjacent heat transfer segment that may join with the end of the present heat transfer segment may be similar or substantially identical the end of the present heat transfer segment to which it may join.

The angular offset may be 1-20°, 2-15° or 5-10°. The angular offset may be less than 20°, less than 15°, less than 10° or less than 5°. The angular offset may be greater than 1°, greater than 5°, greater than 10° or greater than 15°.

The segment may comprise a general end-to-end direction. This may be a first direction. The first direction may extend generally from one end to the other. The first direction may be the general direction of fluid flow through the first flow path (see below).

The angular offset may be seen as a rotation about the third direction, preferably only a rotation about the third direction. Thus, the respective first and second directions of said adjacent heat transfer segments may be offset by a certain amount about the third direction. The third direction may be substantially the same for adjacent heat transfer segments. The first direction may be different. The second direction may be different.

The enclosure bars of a first of said ends of the heat transfer segment may be shaped and arranged such that the normal of the general plane of said first end (which is at least partially defined by said enclosure bars) is not parallel with first direction.

The enclosure bars of a second end (i.e. the other end) of the heat transfer segment may be shaped and arranged such that the normal of the general plane of said second end (which is at least partially defined by said enclosure bars) is not parallel with first direction. In this case, it could be said that both ends add to the angular offset (or curvature), e.g. when the heat transfer segment is an acute or isosceles trapezoid prism (see below). Such a segment may be used as a non-end segment of a curved heat exchanger (e.g. the intermediate segment discussed below).

Alternatively, the enclosure bars of the second end of the heat transfer segment may be shaped and arranged such that the normal of the general plane of said second end (which is at least partially defined by said enclosure bars) is parallel with first direction. In this case, it could be said that only the first end adds to the angular offset (or curvature), e.g. when the heat transfer segment is a right trapezoid prism (see below). Such a segment may be used as an end segment of a curved heat exchanger.

The enclosure bars of the second end of the heat transfer segment may be shaped and arranged such that the normal of the general plane of said second end (which is at least partially defined by said enclosure bars) is not parallel with the normal of the general plane of the first end.

By angular offset it may mean that the respective first directions of adjacent heat transfer segments are oriented in different directions. This may be the only angular offset caused by the shape and arrangement of the enclosure bars. The angular offset may be such that when a plurality of the heat transfer segments are placed in an end-to-end fashion, their respective first directions form a general curve.

The normal to the general plane of at least one end of the heat transfer segment may not be parallel with the general end-to-end direction of the heat transfer segment. The normal to the general plane of one end of the heat transfer segment may be parallel with the general end-to-end direction of the heat transfer segment. Alternatively, the normal to the respective general planes of both ends of the heat transfer segment may not be parallel with the general end-to-end direction of the heat transfer segment. The normal to the respective general planes of both ends of the heat transfer segment may not be parallel with one another. The general end-to-end direction may be the first direction.

The enclosure bars may each comprise a surface that at least partially defines the ends of the heat transfer segment. At least some of said surfaces may comprise a groove for retaining a bonding material, such as a bonding slug. The groove may comprise a bonding material, such as a bonding slug. The bonding material may be a brazing material, or an adhesive material. The bonding slug may be a brazing slug. The bonding material may be a bonding material that can be used to join the end surfaces of the enclosure bars to end surfaces of the enclosure bars of the adjacent heat transfer segment.

The heat transfer segment may be generally shaped as a trapezoidal prism. The non-parallel opposite surfaces of said trapezoidal prism are the ends of the heat transfer segment. As is the case for any trapezoidal prism, the trapezoidal prism may consist of six surfaces. The six surfaces consist of three opposite pairs. The first pair may be considered to be the two ends of the heat transfer segment discussed above. The second pair may be the two sides of heat transfer segment. The third pair may be the top and bottom of the heat transfer segments. Two of the pairs may be parallel surfaces; the third pair may not be parallel. In the present case, the ends may not be parallel with each other, the sides may be parallel with each other, and the top and bottom may be parallel with each other.

The trapezoidal prism may be an acute trapezoid prism, such as an isosceles trapezoid prism. The trapezoidal prism may be a right trapezoid prism. The prism may be a right prism. For instance, the sides of the heat transfer segment may be in the shape of a trapezoid and the top, bottom and both end surfaces may extend perpendicularly to the side surfaces between the side surfaces (i.e. the top, bottom and both end surfaces may be square or rectangular). Thus, it may be an isosceles right prism or a right trapezoid right prism.

The enclosure bars may be shaped and arranged such that when said heat transfer segment is joined to an adjacent heat transfer segment the enclosure bars may meet corresponding enclosure bars of the adjacent heat transfer segment such that there is no void between the adjacent heat transfer segments. As mentioned above, by having appropriate enclosure bars, the enclosure bars of adjacent heat transfer segments can meet each other, which means there may be no void between adjacent heat transfer segments, which means the pressure drop associated with the void is avoided, and hence the efficiency of the heat exchanger is increased.

At least some, and possibly all, of the enclosure bars may be shaped as a trapezoid prism. The end enclosure bars (see below) of at least one end, and possibly both ends, may be shaped as a trapezoid prism, preferably a right trapezoid prism. The side enclosure bars (see below) of at least one side, and preferably both sides, may be shaped as a trapezoid prism, preferably an acute trapezoid prism, preferably an isosceles trapezoid prism.

The heat transfer segment may comprise one or more fluid paths extending in a direction generally from one end of the heat transfer segment to the other (the first direction). The enclosure bars may be shaped such that when said heat transfer segment is joined to an adjacent heat transfer segment the enclosure bars may meet corresponding enclosure bars of the adjacent heat transfer segment such that said one or more fluid paths join corresponding one or more fluid paths of the adjacent heat transfer segment to form one or more continuous fluid paths through the adjacent heat transfer segments. These one or more fluid paths may be the first fluid paths discussed below.

In the typical previous heat exchanger shown in FIGS. 1 and 2, this does not occur since the flow path 6 of one heat transfer segment 2 outputs fluid into the void 13, and fluid from the void 13 then enters the flow path 6 of the adjacent heat transfer segment 2. There therefore is no continuous flow path formed between the angularly offset segments 2; rather, the flow paths 6 in the segments 2 are separated by the void 13. Having a continuous flow path reduces pressure losses and increases the efficiency of the heat exchanger.

Each end of the heat transfer segment may comprise a plurality of end enclosure bars that extend generally across the width of the end of the heat transfer segment and a plurality of side enclosure bars that extend generally in the end-to-end direction of the heat transfer segment. Both the end and side enclosure bars may be shaped and arranged such that when said heat transfer segment is joined to an adjacent heat transfer segment they meet corresponding end and side enclosure bars of the adjacent heat transfer segment.

This may be achieved by the end enclosure bars having varying widths depending on their location in the end of the heat transfer segment. It may be that the width of the end enclosure bars increase with distance from the bottom of the heat transfer segment. The length and depth of all of the end enclosure bars may be the same. By varying widths here it is meant that width of one enclosure bar differs compares to that of the other. Preferably, the width of any given end enclosure bar does not differ along its length or depth, however there may be a slight variation of its width with depth due to the angled bevel discussed below. The end enclosure bars may comprise the first and/or second sets of enclosure bars discussed below.

Additionally or alternatively, this may be achieved by the side enclosure bars having varying lengths depending on their location in the end of the heat transfer segment. It may be that the length of the side enclosure bars increase with distance from the bottom of the heat transfer segment. The width and depth of all of the side enclosure bars may be the same. By varying lengths here it is meant that length of one enclosure bar differs compares to that of the other. Preferably, the length of any given side enclosure bar does not differ along its width or depth, however there may be a slight variation of its length with depth due to the angled bevel discussed below. The side enclosure bars may comprise the third and/or fourth sets of enclosure bars discussed below.

The side enclosure bars may extend from one end to the other end of the heat transfer segment. The side enclosure bars may be located between adjacent end enclosure bars. The side enclosure bars may be located at or toward the ends of the end enclosure bars. The end enclosure bars may be spaced from one another by the side enclosure bars.

The end enclosure bars may extend from one side to the other side of the heat transfer segment. The end enclosure bars may be located between adjacent side enclosure bars. The end enclosure bars may be located at or toward the ends of the side enclosure bars. The side enclosure bars may be spaced from one another by the end enclosure bars.

The heat transfer element may comprise a plurality of separating plates for separating different fluid paths.

The separating plates may be shaped such that when said heat transfer segment is joined to an adjacent heat transfer segment they may meet corresponding separating plates of the adjacent heat transfer segment. When this is the case, the general plane of the end of the heat transfer segment may be at least partially defined by the ends of the separating plates, as well as the enclosure bars.

Alternatively, the separating sheets may not be shaped in this manner. This may mean that only the enclosure bars contact the adjacent heat transfer segment.

The heat transfer segment may comprise one or more heat transfer elements located between the enclosure bars at at least one of the ends of the heat transfer segment, preferably at the end that may meet an adjacent heat transfer element such that said adjacent heat transfer elements are angularly offset from each other. The heat transfer element(s) may be arranged such that when said heat transfer segment is joined to an adjacent heat transfer segment a substantially continuous heat transfer element is formed across the joined ends of the adjacent heat transfer segments. The heat transfer element(s) may be an element that improves heat transfer between the fluids in the heat exchanger, such as a metal corrugation. The heat transfer element(s) may be located in the fluid flow path, preferably the first fluid flow path.

Due to the presence of the void 13 in the prior art, there can be no heat transfer element at the point where the adjacent heat transfer segments 2 meet. However, due to the shape and arrangement of the enclosure bars of the present heat transfer segment, it is possible to have heat transfer elements at such a location, which can increase the effectiveness of the heat transfer segment.

The heat transfer segment may be used as a segment of a curved heat exchanger, the curved heat exchanger being one that is made from a plurality of such segments. The segment may be generally straight (i.e. it is not itself curved), but can be arranged, as discussed above, such that when it is placed in an end-to-end fashion with other similar segment(s), said segments may be angularly offset from one another thus forming the curve of a curved heat exchanger.

The heat transfer segment may comprise a first end and a second end. The first and second ends may be opposite one another. They may be opposite surfaces. They may be separated by the two sides and the top and bottom of the segment. The surfaces generally defined by the first and second ends may be generally planar.

The heat transfer segment may comprise a first side and a second side. The first and second sides may be opposite one another. They may be opposite surfaces. They may be separated by the two ends and the top and bottom of the segment. The surfaces generally defined by the first and second sides may be generally planar.

The heat transfer segment may comprise a top and a bottom. The top and bottom may be opposite one another. They may be opposite surfaces. They may be separated by the two sides and the two ends of the segment. The surfaces generally defined by the top and the bottom may be generally planar.

The general outer shape of the heat transfer segment may consist of the two ends, the two sides, the top and the bottom.

It should be understood that the terms "sides", "ends", "top" and "bottom" used herein are relative terms, and could be used interchangeably. They are not intended to be limiting. For instance, the orientation of the segment could change, and what was "top" surface may actually be the lower-most surface, in which case the "top" surface could be described as the "bottom" surface. Rather, the terms "sides", "ends", "top" and "bottom" are used herein as labels to distinguish the six surfaces of the segment from one another. However, the two sides are always opposite one another, the two ends are always opposite one another and the top and bottom are always opposite one another.

The top and the bottom surfaces may be parallel to each other. The top and the bottom surfaces may be perpendicular to the two sides. The top and the bottom surfaces may be perpendicular to only one of the ends; or the top and the bottom surfaces may be perpendicular to neither of the ends.

The side surfaces may be parallel to each other. The side surfaces may both be perpendicular to the top and bottom. Both sides may be perpendicular to both ends.

The two end surfaces may not be parallel to each other. They may be angularly offset from one another. This may be the angular offset that leads to the curvature of the heat exchanger when the segment is used in the heat exchanger. The two ends may be perpendicular to the two sides. One end (only) may be perpendicular to the top and bottom surfaces; or neither end may be perpendicular to the top and bottom surfaces.

The two sides may be generally trapezoidal in shape. The trapezoid may be an acute trapezoid, such as an isosceles trapezoid; or the trapezoid may be a right trapezoid. The two ends may be generally rectangular, e.g. square, in shape. The top and the bottom ends may be generally rectangular in shape.

The two ends may have substantially the same area (e.g. when the trapezoid is an isosceles trapezoid), or one end may have an area greater than the other (e.g. when the trapezoid is a right trapezoid). The two sides may have substantially the same area. The top may have a great area than the bottom.

A first direction may be defined as the general end-to-end direction. A second direction may be defined as the general bottom-to-top direction. A third direction may be defined as the general side-to-side direction. The first direction may be perpendicular to the second direction. The first direction may be perpendicular to the third direction. The second direction may be perpendicular to the third direction.

The normal to the top and the bottom surfaces may extend parallel to the second direction, and may extend perpendicularly to the first and third directions. The normal to the two side surfaces may extend parallel to the third direction, and may extend perpendicularly to the first and second directions. The normal to only one of the end surfaces may extend parallel to the first direction; or the normal to neither of the end surfaces may extend parallel to the first direction. The normal to both the end surfaces may extend perpendicularly to the third direction. The normal to only one of the end surfaces may extend perpendicularly to the second direction; or the normal to neither of the end surfaces may extend perpendicularly to the second direction.

The bottom of the segment may be defined by a bottom plate. The top of the segment may be defined by a top plate. Between the top and bottom plate there may be plurality of components arranged to form the flow paths for heat exchange fluid within the segment and to form the ends and sides of the segment.

The components may comprise the enclosure bars. The components may comprise the separating plates. The components may comprise the heat transfer elements.

The enclosure bars and the separating plates may define a plurality of flow paths in the segment. The enclosure bars may space the separating plates from each other. Each flow path may have two openings at opposite sides or ends of the segment. The enclosure bars may enclose two sides of each flow path, said two sides extending between said two openings.

The enclosure bars may comprise end enclosure bars and side enclosure bars. The end enclosure bars may be located at the ends of the segment, and may extend across the ends of the segment from one side to another. The end enclosure bars may be located at the sides of the segment, and may extend across the side of the segment from one end to another. The end enclosure bars may comprise the first and second sets (see below). The side enclosure bars may comprise the third and fourth sets (see below).

A first set of enclosure bars at least partially defines a first end of the segment. The first set of enclosure bars may be described as end enclosure bars. The first set of enclosure bars have a length in the third direction, a depth in the second direction and a width in the first direction.

Each enclosure bar of the first set may comprise an outer surface that at least partially defines the first end of the segment. The outer surfaces of all the enclosure bars of the first set may be in the same general plane, which may have normal parallel to the first direction, or not parallel the first direction (in which case the widths of the enclosure bars vary with the second direction (see below)). The outer surfaces may have a normal parallel to the first direction, or not parallel to the first direction (in which case they may be described as bevelled (see below)).

Each enclosure bar of the first set may comprise an inner surface opposite the outer surface. The inner surfaces of all the enclosure bars of the first set may be in the same general plane, which may have a normal parallel to the first direction. The inner surfaces may have a normal parallel to the first direction.

Each enclosure bar of the first set may comprise a first end surface that at least partially defines the first side of the segment. The first end surfaces of all the enclosure bars of the first set may be in the same general plane, which may have a normal parallel to the third direction. The first end surfaces may have a normal parallel to the third direction.

Each enclosure bar of the first set may comprise a second end surface that at least partially defines the second side of the segment, and that is opposite the first end surface. The second end surfaces of all the enclosure bars of the first set may be in the same general plane, which may have a normal parallel to the third direction. The second end surfaces may have a normal parallel to the third direction.

Each enclosure bar of the first set may comprise a top surface that extends between the two side surfaces and the inner and outer surfaces. The top surfaces may all have a normal parallel to the second direction.

Each enclosure bar of the first set may comprise a bottom surface that is opposite the top surface. The bottom surfaces may all have a normal parallel to the second direction.

The first set of enclosure bars all extend across the first end of the segment from one side to another. The first set of enclosure bars all extend parallel to one another. The enclosure bars of the first set are spaced from each other in the second direction. The spaces between the enclosure bars of the first set form a set of openings in the first end of the segment. The enclosure bars of the first set are spaced by other enclosure bars (e.g. enclosure bars of the third and fourth sets of enclosure bars, see below) that extend in the first direction. These other enclosure bars may be located at or toward the ends of the first set of enclosure bars. Between each of the first set of enclosure bars and these other enclosure bars, there may be a respective separating plate.

The enclosure bars of the first set may all have the same length as each other (i.e. the length of the enclosure bars do not vary from enclosure bar to enclosure bar). Each enclosure bar may have a uniform length along its width and depth (i.e. the length of each bar does not vary with respect to the first or third directions).

The enclosure bars of the first set may all have the same depth as each other (i.e. the depth of the enclosure bars do not vary from enclosure bar to enclosure bar). Each enclosure bar may have a uniform depth along its width and length (i.e. the depth of each bar does not vary with respect to the first or second directions), except possibly for the very outer portion when the bevel (see below) is present, in which case the depth of the outer portion will vary with the width of the bar.

The enclosure bars of the first set may all have the same width as each other (i.e. the width of the enclosure bars do not vary from enclosure bar to enclosure bar). Each enclosure bar may have a uniform width along its depth and length (i.e. the width of each bar does not vary with respect to the third or second directions).

However, alternatively, the enclosure bars of the first set may all have different widths to each other (i.e. the width of the enclosure bars vary from enclosure bar to enclosure bar). The widths of each enclosure bar of the first set may increase from the bottom to the top of the segment (i.e. the widths may increase in the second direction). Each enclosure bar may have a uniform width along its length (i.e. the width of each bar does not vary with respect to the third direction). However, each bar may have a varying width along its depth (i.e. the width of each bar varies with respect to the second direction). The width may increase from the bottom to the top of each enclosure bar (i.e. the width may increase in the second direction). The increase in width of each bar may be at the same rate (with respect to the second direction) as the increase in width from one bar to the next. This may allow the outer surfaces of all of the bars of the first set to be in the same plane. The increase in width of each bar may be described as each bar having a bevelled outer surface. The increase in width from one bar to the next, and the bevelling of the outer surface allows for the segments in the curved heat exchanger to be angularly offset whilst having their enclosure bars join to one another.

The enclosure bars of the first set may be cuboid in shape (e.g. when the enclosure bars do not comprise a bevelled outer surface). This may be the case for an end of a segment that is to be used as the end of the heat exchanger.

The enclosure bars of the first set may be trapezoid prism-shaped, preferably a right trapezoid right prism-shaped (e.g. when the enclosure bars that do not comprise the bevelled outer surface). This may be the case for an end of a segment that is used as an intermediate segment in the heat exchanger. The end surfaces of such enclosure bars may be shaped as trapezoids, preferably right trapezoids, and these end surfaces may be connected by rectangular surfaces.

A second set of enclosure bars at least partially defines a second end of the segment. The second set of enclosure bars may be described as end enclosure bars. The second set of enclosure bars have a length in the third direction, a depth in the second direction and a width in the third direction.

Each enclosure bar of the second set may comprise an outer surface that at least partially defines the second end of the segment. The outer surfaces of all the enclosure bars of the second set may be in the same general plane, which may have normal parallel to the first direction, or not parallel the first direction (in which case the widths of the enclosure bars vary with the second direction (see below)). The outer surfaces may have a normal parallel to the first direction, or not parallel to the first direction (in which case they may be described as bevelled (see below)).

Each enclosure bar of the second set may comprise an inner surface opposite the outer surface. The inner surfaces of all the enclosure bars of the second set may be in the same general plane, which may have a normal parallel to the first direction. The inner surfaces may have a normal parallel to the first direction.

Each enclosure bar of the second set may comprise a first end surface that at least partially defines the first side of the segment. The first end surfaces of all the enclosure bars of the second set may be in the same general plane, which may have a normal parallel to the third direction. The first end surfaces may have a normal parallel to the third direction.

Each enclosure bar of the second set may comprise a second end surface that at least partially defines the second side of the segment, and that is opposite the first end surface. The second end surfaces of all the enclosure bars of the second set may be in the same general plane, which may have a normal parallel to the third direction. The second end surfaces may have a normal parallel to the third direction.

Each enclosure bar of the second set may comprise a top surface that extends between the two side surfaces and the inner and outer surfaces. The top surfaces may all have a normal parallel to the second direction.

Each enclosure bar of the second set may comprise a bottom surface that is opposite the top surface. The bottom surfaces may all have a normal parallel to the second direction.

The second set of enclosure bars all may extend across the second end of the segment from one side to another. The second set of enclosure bars all may extend parallel to one another. The enclosure bars of the second set may be spaced from each other in the second direction. The spaces between the enclosure bars of the second set may form a set of openings in the second end of the segment. The enclosure bars of the second set may be spaced by other enclosure bars (e.g. enclosure bars of the third and fourth sets of enclosure bars, see below) that extend in the first direction. These other enclosure bars may be located at or toward the ends of the second set of enclosure bars. Between each of the second set of enclosure bars and these other enclosure bars, there may be a respective separating plate.

The enclosure bars of the second set may all have the same length as each other (i.e. the length of the enclosure bars do not vary from enclosure bar to enclosure bar). Each enclosure bar may have a uniform length along its width and depth (i.e. the length of each bar does not vary with respect to the first or third directions).

The enclosure bars of the second set may all have the same depth as each other (i.e. the depth of the enclosure bars do not vary from enclosure bar to enclosure bar). Each enclosure bar may have a uniform depth along its width and length (i.e. the depth of each bar does not vary with respect to the first or second directions), except possibly for the very outer portion when the bevel (see below) is present, in which case the depth of the outer portion will vary with the width of the bar.

The enclosure bars of the second set may all have the same width as each other (i.e. the width of the enclosure bars do not vary from enclosure bar to enclosure bar). Each enclosure bar may have a uniform width along its depth and length (i.e. the width of each bar does not vary with respect to the third or second directions).

However, alternatively, the enclosure bars of the second set may all have different widths to each other (i.e. the widths of the enclosure bars vary from enclosure bar to enclosure bar). The widths of each enclosure bar of the second set may increase from the bottom to the top of the segment (i.e. the widths may increase in the second direction). Each enclosure bar may have a uniform width along its length (i.e. the width of each bar does not vary with respect to the third direction). However, each bar may have a varying width along its depth (i.e. the width of each bar varies with respect to the second direction). The width may increase from the bottom to the top of each enclosure bar (i.e. the width may increase in the second direction). The increase in width of each bar may be at the same rate (with respect to the second direction) as the increase in width from one bar to the next. This may allow the outer surfaces of all of the bars of the second set to be in the same plane. The increase in width of each bar may be described as each bar having a bevelled outer surface. The increase in width from one bar to the next, and the bevelling of the outer surface allows for the segments in the curved heat exchanger to be angularly offset whilst having their enclosure bars join to one another.

The enclosure bars of the second set may be trapezoid prism-shaped, preferably a right trapezoid right prism-shaped (i.e. these enclosure bars that comprise the bevelled outer surface). The end surfaces may be shaped as trapezoids, preferably right trapezoids, and these end surfaces may be connected by rectangular surfaces.

There may be one enclosure bar of the second set for every enclosure bar of the first set, each corresponding pair separating the same two separating plates (or possibly the top or bottom plate from a separating plate). Thus, the pair of enclosure bars and the two plates that they separate may form a second flow path extending generally in the third direction between the openings in the two sides of the heat transfer segment (see below). The second flow path may be closed at the two ends of the segment by the enclosure bars of the first and second sets. The plurality of enclosure bars of the first set, the plurality of enclosure bars of the second set and the plurality of plates form a plurality of second flow paths extending from one side of the segment to the other.

A third set of enclosure bars at least partially defines a first side of the segment. The third set of enclosure bars may be described as side enclosure bars. The enclosure bars of the third set have a length in the first direction, a depth in the second direction and a width in the third direction.

Each enclosure bar of the third set may comprise an outer surface that at least partially defines the first side of the segment. The outer surfaces of all the enclosure bars of the third set may be in the same general plane, which may have a normal parallel to the third direction. The outer surfaces may have a normal parallel to the third direction.

Each enclosure bar of the third set may comprise an inner surface opposite the outer surface. The inner surfaces of all the enclosure bars of the third set may be in the same general plane, which may have a normal parallel to the third direction. The inner surfaces may have a normal parallel to the third direction.

Each enclosure bar of the third set may comprise a first end surface that at least partially defines the first end of the segment. The first end surfaces of all the enclosure bars of the third set may be in the same general plane, which may have a normal parallel to the first direction or not parallel the first direction (in which case the lengths of the enclosure bars vary with the second direction (see below)). The first end surfaces may have a normal parallel to the first direction, or not parallel to the first direction (in which case they may be described as bevelled (see below)).

Each enclosure bar of the third set may comprise a second end surface that at least partially defines the second end of the segment, and that is opposite the first end surface. The second end surfaces of all the enclosure bars of the third set may be in the same general plane, which may have a normal parallel to the first direction or not parallel the first direction (in which case the lengths of the enclosure bars vary with the second direction (see below)). The second end surfaces may have a normal parallel to the first direction, or not parallel to the first direction (in which case they may be described as bevelled (see below)).

Each enclosure bar of the third set may comprise a top surface that extends between the two end surfaces and the inner and outer surfaces. The top surfaces may all have a normal parallel to the second direction.

Each enclosure bar of the third set may comprise a bottom surface that is opposite the top surface. The bottom surfaces may all have a normal parallel to the second direction.

The third set of enclosure bars all extend across the first side of the segment from one end to another. The third set of enclosure bars all extend parallel to one another. The enclosure bars of the third set are spaced from each other in the second direction. The spaces between the enclosure bars of the third set form a set of openings in the first side of the segment. The enclosure bars of the third set are spaced by other enclosure bars (e.g. enclosure bars of the first and second sets of enclosure bars, see above) that extend in the third direction. These other enclosure bars may be located at or toward the ends of the third set of enclosure bars. Between each of the enclosure bars of the third set and these other enclosure bars, there may be a respective separating plate.

The enclosure bars of the third set may all have the same width as each other (i.e. the width of the enclosure bars do not vary from enclosure bar to enclosure bar). Each enclosure bar may have a uniform width along its length and depth (i.e. the width of each bar does not vary with respect to the first or second directions).

The enclosure bars of the third set may all have the same depth as each other (i.e. the depth of the enclosure bars do not vary from enclosure bar to enclosure bar). Each enclosure bar may have a uniform depth along its width and length (i.e. the depth of each bar does not vary with respect to the first or third directions), except possibly for the very end portion(s) when the bevel (see below) is present, in which case the depth of the end portion(s) will vary with the length of the bar.

The enclosure bars of the third set may all have different lengths to each other (i.e. the length of the enclosure bars vary from enclosure bar to enclosure bar). The lengths of each enclosure bar of the third set may increase from the bottom to the top of the segment (i.e. the lengths may increase in the second direction). Each bar may have a varying length along its depth (i.e. the length of each bar varies with respect to the second direction). The length may increase from the bottom to the top of each enclosure bar (i.e. the length may increase in the second direction).

The increase in length of each bar may be at the same rate (with respect to the second direction) as the increase in length from one bar to the next. This may allow the end surfaces of all of the bars of the third set to be in the same plane. The increase in length of each bar may be described as each bar having at least one, and possibly two, bevelled end surface. The increase in length from one bar to the next, and the bevelling of the end surface allows for the segments in the curved heat exchanger to be angularly offset whilst having their enclosure bars join to one another.

The increase in length of each bar may be at the same rate (with respect to the second direction) as the increase in width of the first and/or second set of enclosure bars. This may allow the end surfaces of all of the bars of the third set to be in the same plane as the outer surfaces of the first and/or second set of enclosure bars. The bevelling of the third set may also be such that the end surfaces of all of the bars of the third set to be in the same plane as, and parallel to, the outer surfaces of the first and/or second set of enclosure bars.

The enclosure bars of the third set may be trapezoid prism-shaped, preferably a right trapezoid right prism-shaped. This may be the case when only one of the ends is a bevelled surface. This may be the case when the segment is a segment to be used at the end of the curved heat exchanger. In this case, the inner and outer surfaces of each enclosure bar of the third set may be shaped as trapezoids, preferably right trapezoids, and these inner and outer surfaces may be connected by rectangular surfaces.

The enclosure bars of the third set may be trapezoid prism-shaped, preferably an acute trapezoid right prism-shaped, preferably isosceles trapezoid right prism-shaped. This may be the case when both of the ends are bevelled surfaces. This may be the case when the segment is a segment to be used as an intermediate segment (i.e. between two other segments) in the curved heat exchanger. In this case, the inner and outer surfaces of each enclosure bar of the third set may be shaped as trapezoids, preferably acute trapezoids, preferably isosceles trapezoids, and these inner and outer surfaces may be connected by rectangular surfaces.

A fourth set of enclosure bars at least partially defines a second side of the segment. The fourth set of enclosure bars may be described as side enclosure bars. The enclosure bars of the fourth set have a length in the first direction, a depth in the second direction and a width in the third direction.

Each enclosure bar of the fourth set may comprise an outer surface that at least partially defines the second side of the segment. The outer surfaces of all the enclosure bars of the fourth set may be in the same general plane, which may have a normal parallel to the third direction. The outer surfaces may have a normal parallel to the third direction.

Each enclosure bar of the fourth set may comprise an inner surface opposite the outer surface. The inner surfaces of all the enclosure bars of the fourth set may be in the same general plane, which may have a normal parallel to the third direction. The inner surfaces may have a normal parallel to the third direction.

Each enclosure bar of the fourth set may comprise a first end surface that at least partially defines the first end of the segment. The first end surfaces of all the enclosure bars of the fourth set may be in the same general plane, which may have a normal parallel to the first direction or not parallel the first direction (in which case the lengths of the enclosure bars vary with the second direction (see below)). The first end surfaces may have a normal parallel to the first direction, or not parallel to the first direction (in which case they may be described as bevelled (see below)).

Each enclosure bar of the fourth set may comprise a second end surface that at least partially defines the second end of the segment, and that is opposite the first end surface. The second end surfaces of all the enclosure bars of the fourth set may be in the same general plane, which may have a normal parallel to the first direction or not parallel the first direction (in which case the lengths of the enclosure bars vary with the second direction (see below)). The second end surfaces may have a normal parallel to the first direction, or not parallel to the first direction (in which case they may be described as bevelled (see below)).

Each enclosure bar of the fourth set may comprise a top surface that extends between the two end surfaces and the inner and outer surfaces. The top surfaces may all have a normal parallel to the second direction.

Each enclosure bar of the fourth set may comprise a bottom surface that is opposite the top surface. The bottom surfaces may all have a normal parallel to the second direction.

The fourth set of enclosure bars all extend across the second side of the segment from one end to another. The fourth set of enclosure bars all extend parallel to one another. The enclosure bars of the fourth set are spaced from each other in the second direction. The spaces between the enclosure bars of the fourth set form a set of openings in the second side of the segment. The enclosure bars of the fourth set are spaced by other enclosure bars (e.g. enclosure bars of the first and second sets of enclosure bars, see above) that extend in the third direction. These other enclosure bars may be located at or toward the ends of the fourth set of enclosure bars. Between each of the enclosure bars of the fourth set and these other enclosure bars, there may be a respective separating plate.

The enclosure bars of the fourth set may all have the same width as each other (i.e. the width of the enclosure bars do not vary from enclosure bar to enclosure bar). Each enclosure bar may have a uniform width along its length and depth (i.e. the width of each bar does not vary with respect to the first or second directions).

The enclosure bars of the fourth set may all have the same depth as each other (i.e. the depth of the enclosure bars do not vary from enclosure bar to enclosure bar). Each enclosure bar may have a uniform depth along its width and length (i.e. the depth of each bar does not vary with respect to the first or third directions), except possibly for the very end portion(s) when the bevel (see below) is present, in which case the depth of the end portion(s) will vary with the length of the bar.

The enclosure bars of the fourth set may all have different lengths to each other (i.e. the length of the enclosure bars vary from enclosure bar to enclosure bar). The lengths of each enclosure bar of the fourth set may increase from the bottom to the top of the segment (i.e. the lengths may increase in the second direction). Each bar may have a varying length along its depth (i.e. the length of each bar varies with respect to the second direction). The length may increase from the bottom to the top of each enclosure bar (i.e. the length may increase in the second direction).

The increase in length of each bar may be at the same rate (with respect to the second direction) as the increase in length from one bar to the next. This may allow the end surfaces of all of the bars of the fourth set to be in the same plane. The increase in length of each bar may be described as each bar having at least one, and possibly two, bevelled end surface. The increase in length from one bar to the next, and the bevelling of the end surface allows for the segments in the curved heat exchanger to be angularly offset whilst having their enclosure bars join to one another.

The increase in length of each bar may be at the same rate (with respect to the second direction) as the increase in width of the first and/or second set of enclosure bars. This may allow the end surfaces of all of the bars of the fourth set to be in the same plane as the outer surfaces of the first and/or second set of enclosure bars. The bevelling of the fourth set may also be such that the end surfaces of all of the bars of the fourth set to be in the same plane as, and parallel to, the outer surfaces of the first and/or second set of enclosure bars.

The bevelling angle at the first end, and the increase in length from one bar to the next, of the third set of enclosure bars may be equal to the bevelling angle at the first end, and the increase in length from one bar to the next, of the fourth set of enclosure bars. The bevelling angle at the second end, and the increase in length from one bar to the next, of the third set of enclosure bars may be equal to the bevelling angle at the second end, and the increase in length from one bar to the next, of the fourth set of enclosure bars.

There may be one enclosure bar of the fourth set for every enclosure bar of the third set, each corresponding pair separating the same two separating plates (or possibly the top or bottom plate from a separating plate). Thus, the pair of enclosure bars and the two plates that they separate may form a first flow path extending generally in the first direction between the openings in the two ends of the heat transfer segment (see below). The first flow path may be closed at the two sides of the segment by the enclosure bars of the third and fourth sets. The plurality of enclosure bars of the third set, the plurality of enclosure bars of the fourth set and the plurality of plates form a plurality of second flow paths extending from one end of the segment to the other.

The enclosure bars of the fourth set may be trapezoid prism-shaped, preferably a right trapezoid right prism-shaped. This may be the case when only one of the ends is a bevelled surface. This may be the case when the segment is a segment to be used at the end of the curved heat exchanger. In this case, the inner and outer surfaces of each enclosure bar of the fourth set may be shaped as trapezoids, preferably right trapezoids, and these inner and outer surfaces may be connected by rectangular surfaces.

The enclosure bars of the fourth set may be trapezoid prism-shaped, preferably an acute trapezoid right prism-shaped, preferably isosceles trapezoid right prism-shaped. This may be the case when both of the ends are bevelled surfaces. This may be the case when the segment is a segment to be used as an intermediate segment (i.e. between two other segments) in the curved heat exchanger. In this case, the inner and outer surfaces of each enclosure bar of the fourth set may be shaped as trapezoids, preferably acute trapezoids, preferably isosceles trapezoids, and these inner and outer surfaces may be connected by rectangular surfaces.

The third set of enclosure bars may be substantially identical to the fourth set of enclosure bars. This may be the case for a particular heat transfer segment.

The bevelling angle at the first ends of the third and fourth sets of enclosure bars may be equal to the bevelling angle at the outer surfaces of the first set of enclosure bars. The bevelling angle at the second ends of the third and fourth sets of enclosure bars may be equal to the bevelling angle at the outer surfaces of the second set of enclosure bars.

The increase in length from one bar to the next of the third and fourth sets of enclosure bars may correspond to the increase in width from one bar to the next of the first and/or second sets of enclosure bars.

Thus, the first end of the segment may be defined by the outer surfaces of the first set of enclosure bars and the first ends of the third and fourth sets of enclosure bars. The second end of the segment may be defined by the outer surfaces of the second set of enclosure bars and the second ends of the third and fourth sets of enclosure bars. The first side of the segment may be defined by the outer surfaces of the third set of enclosure bars and the first ends of the first and second sets of enclosure bars. The second side of the segment may be defined by the outer surfaces of the fourth set of enclosure bars and the second ends of the first and second sets of enclosure bars.

In comparison, to the above-described enclosure bars, the enclosure bars of the prior art are merely cuboid-shaped, as can be seen in FIGS. 1 and 2, and merely define a cuboid-shaped heat transfer segment.

As mentioned above, the heat transfer segment may comprise a plurality of separating plates. The separating plates may be planar, preferably with a normal parallel to the second direction. The separating plates may extend across the segment from one side to the other. The separating plates may separate adjacent flow paths in the segment from one another, such that fluid cannot flow between adjacent flow paths. The separating plates may be rectangular in shape. The length of the separating plates may be in the first direction, the width of the separating plates may be in the third direction and the depth of the separating plates may be in the second direction. The separating plates are spaced from one another in the third direction by the enclosure bars.

The separating plates may extend across the segment from one end to the other. The area of the separating plates may vary from one separating plate to the next. The length of the separating plates may vary from one separating plate to the next. The width of all of the separating plates may be the same. The depth of all of the separating plates may be the same. Their area and/or length may vary such that each of the separating plates extends to both ends of the heat transfer segment (i.e. the end surfaces of the heat transfer segment may be at least partially defined, not only by the enclosure bars but also by the separating plates). In this case, the lengths of the separating plates, from one separating plates to the next, may vary with the second direction. The lengths may increase from the separating plate nearest the bottom plate to the separating plate nearest the top plate. The lengths may vary in the same way as the shape of the enclosure bars vary, such that when an adjacent heat transfer segment is joined to the heat transfer segment the separating plates of the two adjacent heat transfer segments may meet one another, and may possibly be joined to one another.

The end surface of each separating plate may be flush with the surfaces of the enclosure bars that also define the end surfaces of the heat transfer segment (e.g. the outer surfaces of the first and second sets of enclosure bars and the end surfaces of the third and fourth sets of enclosure bars). To ensure that the end surfaces are flush in this way, the end surfaces of the separating bars may bevelled in the same way (i.e. the same angle) as the bevel of the enclosure bars discussed above.

Alternatively, the separating plates may not extend across the segment from one end to the other. The area of the separating plates may be constant from one separating plate to the next. The area of each of the separating plates may be substantially the same as the bottom plate. The length of the separating plates may be constant from one separating plate to the next (i.e. the lengths of all of the separating plates may be the same). The width of all of the separating plates may be the same. The depth of all of the separating plates may be the same. The separating plates may therefore not extend to both ends of the heat transfer segment.

The separating plates may extend to one of the ends (e.g. an end that is not angularly offset, e.g. an end that does not have enclosure bars of varying widths) and may not extend to the other end (e.g. an end that is angularly offset, e.g. an end that does have enclosure bars of varying widths). In this case, one end (e.g. the end that is not angularly offset) may be partially defined by the end of the separating plates and the other end (e.g. the end that is angularly offset) may not be partially defined by the end of the separating plates. The ends of the separating plates that extend to the one end of the segment may be flush with the surfaces of the enclosure bars of that end of the segment. Alternatively, the separating plates may extend to neither of the ends (e.g. when both ends of the segment are angularly offset).

The heat transfer segment may comprise a plurality of first flow paths extending in one direction, preferably the first direction, for passing fluid therethrough, preferably generally in the first direction. The first flow paths may extend from one end of the heat transfer segment to the other. The first flow paths may be defined by and between the enclosure bars of the third and fourth sets and the separating plates, and possibly the top and/or bottom plates for the uppermost and lowermost flow paths. The flow paths each have an opening in the first and second ends of the heat transfer segment.

The heat transfer segment may comprise a plurality of second flow paths extending in another direction, preferably the third direction, for passing fluid therethrough, preferably generally in the third direction. The second flow paths may extend from one side of the heat transfer segment to the other. The second flow paths may be defined by and between the enclosure bars of the first and second sets and the separating plates, and possibly the top and/or bottom plates for the uppermost and lowermost flow paths. The flow paths each have an opening in the first and second sides of the heat transfer segment.

The first and second flow paths may not be in fluid communication with another. Rather, they may be separated by the separating plates such that fluid cannot flow between a first flow path and a second flow path.

There may be one second flow path located between adjacent first flow paths. There may be one first flow path located between adjacent second flow paths.

The first and second flow paths are preferably substantially generally perpendicular to one another.

The first flow paths may be used to pass a first fluid therethrough. The second flow paths may be used to pass a second fluid therethrough. The separating sheets may allow heat to transfer between the two fluids. Preferably, the first fluid may be the hot fluid and the second fluid may be the cold fluid (i.e. the first fluid may be the fluid to be cooled and the second fluid may be the cooling fluid, that originally at least has a temperature lower than the first fluid).

As may be appreciated, due to the shape and arrangement of the enclosure bars of the present heat transfer segment, when a plurality of heat transfer segments are arranged in an end-to-end fashion, the first flow paths of one heat transfer segment may be in direct communication (i.e. communication without any gap therebetween) with the respective first flow paths of an adjacent heat transfer segment. This allows, in effect, the first flow paths to extend continuously through the plurality of heat transfer segments, preferably with no voids as occurs in the prior art.

When in use in a heat exchanger, it should be appreciated that the sides of the heat transfer segment may be in communication with a manifold for introducing and/or receiving the second fluid. The ends of the heat transfer segments at the ends of the heat exchanger may be in communication with a manifold for introducing and/or receiving the first fluid.

As mentioned above, the heat transfer segment may comprise a plurality of heat transfer elements. The heat transfer elements may be located in the first and/or second flow paths, preferably there may be one or more heat transfer elements in each of the first and/or second flow paths. The heat transfer elements may be a component that improves the heat transfer between the first and second flow paths. The heat transfer element may be a corrugated panel, whose peaks and troughs may preferably contact the two separating plates that define a given flow path, and whose corrugations may preferably run parallel with the flow direction of said flow path. The heat transfer element may be ribs or pegs extending between and/or from and/or the separating panels.

When present in the second flow paths, the heat transfer elements may, or may not, extend through the second flow paths across the heat transfer segment from one side to the other. These heat transfer elements may extend across the heat transfer segment from end to the other.

When present in the first flow paths, the heat transfer elements may, or may not, extend through the first flow paths across the heat transfer segment from one end to the other. These heat transfer elements may extend across the heat transfer segment from end to the other.

The end surface(s) of the heat transfer segment that are angularly offset (i.e. the end surface(s) that have the enclosure bars of varying widths) may also be at least partially defined by the heat transfer elements. This may mean that when an adjacent heat transfer segment is joined to the heat transfer segment the heat transfer elements of the two adjacent heat transfer segments may meet one another, and may possibly be joined to one another, thus forming a substantially continuous heat transfer element. This is not possible in the prior art due to the void 13 (see FIGS. 1 and 2).

The heat transfer segment may comprise one or more first flow paths extending generally from one end of the segment to the other (e.g. in the first direction of the segment). The adjacent heat transfer segment may also comprise one or more first flow paths extending generally from one end of the adjacent segment to the other (e.g. in the first direction of the adjacent segment). The enclosure bars may be shaped and arranged such that, when said heat transfer segment is joined to said adjacent heat transfer segment in an end-to-end fashion, the one or more flow paths of the heat transfer segment may meet the one or more flow paths of the adjacent segment so as to form one or more substantially continuous flow paths through both of the segments (i.e. from one end of the curved heat exchanger formed by the two segments to the other end). Said one or more substantially continuous flow paths may have a substantially constant cross section throughout the continuous flow path (i.e. there may not be any large voids in the continuous first flow path, as described in the prior art, between the adjacent segments). There may be some small degree of variation of cross section, but this would only be minor. The cross section may be defined as the area of the one or more first flow paths perpendicular to the first direction (i.e. the end-to-end direction).

In another aspect, the invention provides a curved heat exchanger comprising a plurality of the heat transfer segments as discussed above, wherein said heat transfer segments are joined to one another in an end-to-end fashion such that, due to said shape and arrangement of said enclosure bars, said adjacent heat transfer segments are angularly offset from one another such that said angular offset at least partially defines the curve of the curved heat exchanger.

The curved heat exchanger may be cross-flow heat exchanger.

The plurality of heat transfer segments may be substantially identical to each other, or may be different to each other. The heat exchanger may comprise or consist of two end heat transfer segments that define the ends of the heat exchanger. The heat exchanger may comprise one or more intermediate heat transfer segments that connect the two end heat transfer segments. The two end heat transfer segments may be substantially identical to each other, and/or symmetrical to each other (about the plane of the end that meets the adjacent heat transfer segment). Where there are two or more intermediate heat transfer segments, these may be identical to one another. The end heat transfer segments may be right trapezoid prisms, preferably right trapezoid right prisms. The intermediate heat transfer segments may be acute trapezoid prisms, preferably isosceles trapezoid prisms, preferably acute trapezoid right prisms, preferably isosceles trapezoid rights prisms.

Where there are three or more heat transfer segments, the angular offset between respective adjacent segments may be substantially the same, or may be different.

The first flow paths of each heat transfer segment meet respective first flow paths of the adjacent heat transfer segment(s), thus forming continuous first flow paths from one end of the curved heat exchanger to the other. In the prior art, there is no such continuous first flow path, since the first flow paths are interrupted by the void.

The curved heat exchanger of this aspect may not comprise a void between respective adjacent heat transfer segments. The curved heat exchanger may not comprise any voids or gaps in the first flow paths from one end of the heat exchanger to the other.

The first flow paths from one end of the heat exchanger to the other may have substantially constant cross sections along their lengths (i.e. along the first direction, from one end of the heat exchanger to the other). This is not the case in the prior art, where the voids effectively dramatically increase the cross section of the first flow path at locations between adjacent segments, which leads to pressure drops as discussed above.

The heat exchanger may comprise one or more manifolds. The sides of the heat transfer segments may be in communication with a manifold for introducing and/or receiving the second fluid. The ends of the heat transfer segments at the ends of the curved heat exchanger may be in communication with a manifold for introducing and/or receiving the first fluid.

The heat exchanger may be a four-core heat exchanger, with two end heat transfer segments connected by two intermediate heat transfer segments.

In another aspect, the invention provides a method of manufacturing a curved heat exchanger as discussed above, wherein said heat transfer segments are provided, the method comprising: placing said heat transfer segments in an end-to-end fashion such that the enclosure bars of one of said ends of one of said heat transfer segments are adjacent to corresponding enclosure bars of one of said ends of an adjacent heat transfer segment; and joining said adjacent enclosure bars to one another using a joining process.

The method may also comprise constructing the heat transfer segments. This may be performed by joining the appropriate components (e.g. the bottom plate, the top plate, the separating plates, the enclosure bars and/or the heat transfer elements) together, e.g. by brazing, or by creating the heat transfer segments by laminating sheets together to build up the heat transfer segment, or by a 3-D printing technique.

The method may comprise placing a bond foil between said adjacent enclosure bars prior to joining said adjacent enclosure bars. The bond foil may be shaped so as to correspond to the specific shape of the ends of the adjacent heat transfer segments that have been brought adjacent to one another. For instance, the bond foil may be shaped such that there are holes in the bond foil wherever there are openings in the ends of the heat transfer elements (e.g. the spaces between the enclosure bars (and possibly the separating plates and/or heat transfer elements) that defines the first flow path), i.e. the bond foil only has material where the adjacent ends actually contact one another (e.g. where the end faces of the adjacent enclosure bars (and possibly the separating plates and possibly the heat transfer elements) contact one another). The foil may be a brazing foil.

Thus, the bond foil may have a shape corresponding to the shape defined by the end surfaces of said adjacent enclosure bars, and possibly the ends of the separating plates, and possibly the ends of the heat transfer elements, that define the ends of the heat transfer segments to be joined.

Additionally/alternatively, when one or more of the heat transfer segments comprise a slug of bonding material in the ends of the enclosure bars (see above), the method may comprise using said slug(s) to join the adjacent enclosure bars. When one or more of the heat transfer segments comprise a groove in the ends of the enclosure bars, the method may comprise placing a bonding slug in each of said grooves prior to joining said adjacent enclosure bars.

The method may comprise machining the enclosure bars to the desired shape. In this case, the provided heat transfer segment may be one whose first and second sets of enclosure bars have uniform widths, and whose third and fourth sets of enclosure bars have uniform lengths. It may therefore have a cuboid shape. The enclosure bars at the ends of the heat transfer segments may be machined so as to produce the angular offset (e.g. they are cut at angle so as to vary the shape of the enclosure bars as discussed above). In a similar way, the provided top plate may all be the same as the bottom plate, and these plates may be machined to produce the angular offset. The provided separating plates may all have the same area and may be machined to produce the angular offset. The provided heat transfer elements may all have the same area and may be machined to produce the angular offset.

In order to make this machining possible, the provided heat transfer segment may have components that are extended outward in the first direction in comparison to the heat transfer segment of the prior art (e.g. the widths of the first and/or second sets of enclosure bars may be longer, the lengths of the third and fourth sets of enclosure bars may be longer, the lengths of the separating plates may be longer, the lengths of the heat transfer elements may be longer, the length of the bottom plate may (or may not be) longer and/or the length of the top plate may (or may not be) longer).

Once the enclosure bars (and possibly the separating plates and heat transfer elements) are joined to one another, a weld seem may be added around the outside of the heat transfer segment joins to seal the join.

Certain preferred embodiments will now be described by way of example only and with reference to the accompanying drawings, in which FIG. 1 shows a perspective view of an exemplary curved heat exchanger of the prior art;

FIG. 3 shows a perspective view of an exemplary curved heat exchanger according to an embodiment of the present invention;

FIG. 4 shows a cross-section view of the curved heat exchanger of FIG. 3;

FIGS. 1 and 2 are described above.

Figure 1:
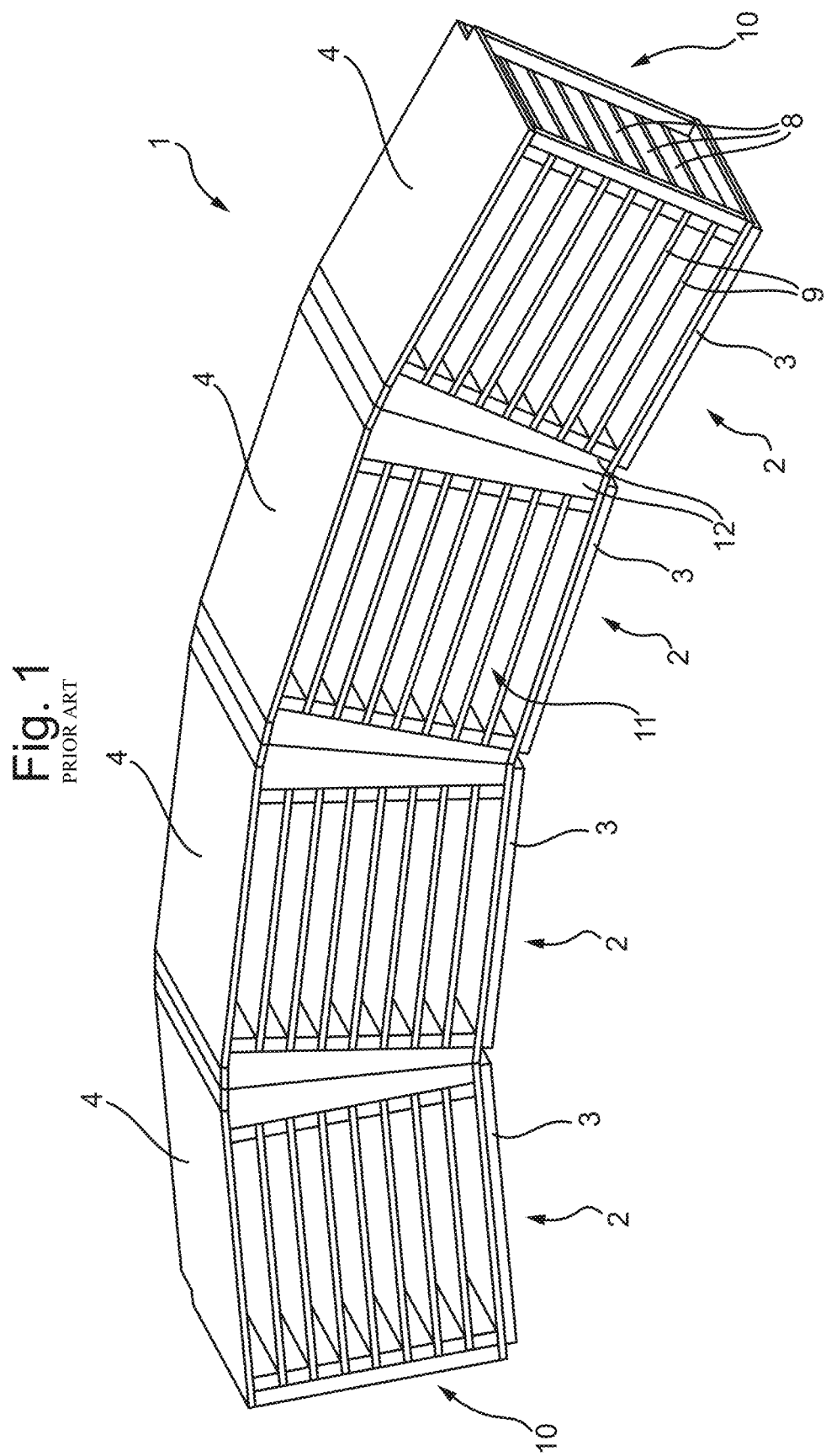
Figure 2:
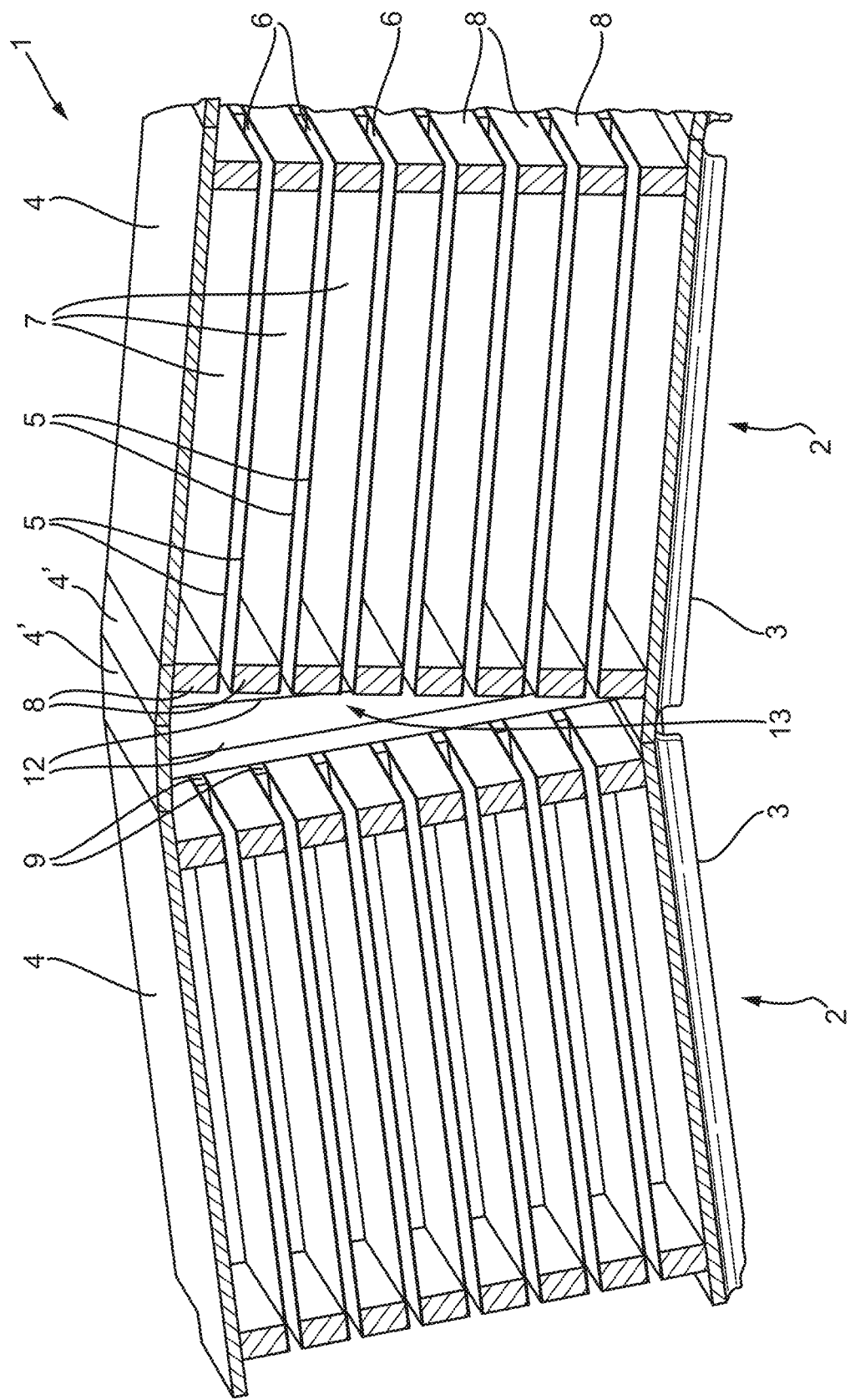
FIG. 2 shows a cross-section view of the curved heat exchanger of FIG. 1.

Regarding FIGS. 3 and 4, this shows a cross-section of a curved heat exchanger 101 according to an embodiment of the present invention, which is similar to the curved heat exchanger 1 of FIGS. 1 and 2 except where discussed below.

The curved heat exchanger 101 comprises a plurality of heat transfer segments 102. Shown in FIG. 3 is an end segment 102' at the end of the curved heat exchanger 101 and an intermediate segment 102" located between two segments 102 of the curved heat exchanger 101.

Each heat transfer segment 102 comprises a first end 1021 and a second end 1022. The first 1021 and second 1021 ends are opposite one another. They are separated by first 1023 and second 1024 sides and the top 104 and bottom 103 of the segment 102. The surfaces generally defined by the first 1021 and second 1022 ends are generally planar.

The heat transfer segment 102 comprises a first side 1023 and a second side 1024. The first and second sides 1023, 1024 are opposite one another. They may be separated by the two ends 1021, 1022 and the top 104 and bottom 103 of the segment. The surfaces generally defined by the first and second sides 1023, 1024 are generally planar.

The heat transfer segment comprises a top 104 and a bottom 103. The top 104 and bottom 103 are opposite one another. They are separated by the two sides 1023, 1024 and the two ends 1021, 1022 of the segment. The surfaces generally defined by the top 104 and the bottom 103 are generally planar.

The general outer shape of the heat transfer segment 102 consists of the two ends 1021, 1022, the two sides 1023, 1024, the top 104 and the bottom 103.

The top 104 and the bottom surfaces 103 are parallel to each other and are perpendicular to the two sides 1023, 1024. The top 104 and the 103 are of the end segment 102' are perpendicular to only the first end 1021, and is not perpendicular to the second end 1022. The top 104 and the 103 are of the intermediate segment 102' are perpendicular to neither of the ends 1021, 1022. The top 104 and the bottom 103 surfaces are perpendicular to the two sides 1023, 1024.

The side surfaces 1023, 1024 are parallel to each other and are both perpendicular to the top 104 and bottom 103 and to both ends 1021, 1022.

The two end surfaces 1021, 1022 are not parallel to each other.

The two sides 1023, 1024 are generally trapezoidal in shape. In the case of the intermediate segment 102", the trapezoid is an isosceles trapezoid. In the case of the end segment 102', the trapezoid is a right trapezoid. The two ends 1021, 1022 are rectangular and the top 104 and the bottom 103 ends are generally rectangular.

In the case of the intermediate segment 102", the two ends 1021, 1022 have substantially the same area. In the case of the end segment 102', one end 1022 has an area greater than the other 1021. The two sides 1023, 1024 have substantially the same area. The top 104 has a great area than the bottom 103.

For any given segment 102, a first direction x is defined as the general end-to-end direction. A second direction y is defined as the general bottom-to-top direction. A third direction z is defined as the general side-to-side direction. It should be noted that the first and second directions x, y are different from segment to segment due to the angular offset between segments. The third direction z is constant from segment to segment.

The bottom 103 of the segment 102 is defined by a bottom plate 103. The top 104 of the segment 102 is defined by a top plate 104. Between the top 103 and bottom 104 plate there are a plurality of components arranged to form the flow paths 106, 107 and to form the ends 1021, 1022 and sides 1023, 1024 of the segment 102.

The components comprise the enclosure bars 108, 109. The components comprise the separating plates 105. The components may comprise the heat transfer elements (not shown).

The enclosure bars 108, 109 comprise end enclosure bars 108 and side enclosure bars 109. The end enclosure bars 108 are located at the ends 1021, 1022 of the segment 102, and extend across the ends 1021, 1022 of the segment 102 from one side 1023 to another 1024. The end enclosure bars 109 are located at the sides 1023, 1024 of the segment 102, and extend across the side 1023, 1024 of the segment 102 from one end 1021 to another 1022. The end enclosure bars 108 comprise the first and second sets 1081, 1082. The side enclosure bars 109 comprise the third and fourth sets 1091, 1092.

A first set of enclosure bars 1081 at least partially defines a first end 1021 of the segment 102. The first set of enclosure bars 1081 may be described as end enclosure bars. The first set of enclosure bars 1081 have a length 1 in the third direction z, a depth d in the second direction y and a width w in the first direction x.

Each enclosure bar 108 of the first set 1081 comprises an outer surface 120 that at least partially defines the first end 1021 of the segment 102. The outer surfaces 120 of all the enclosure bars 108 of the first set 1081 are in the same general plane, which in the case of the end segment 102' has a normal parallel to the first direction x and in the case of the intermediate segment 102" has a normal not parallel the first direction x. In the case of the end segment 102', the outer surfaces 120 have a normal parallel to the first direction x. In the case of the intermediate segment, 102" the outer surfaces 120 have a normal that is not parallel with the first direction x.

Figure 5A:
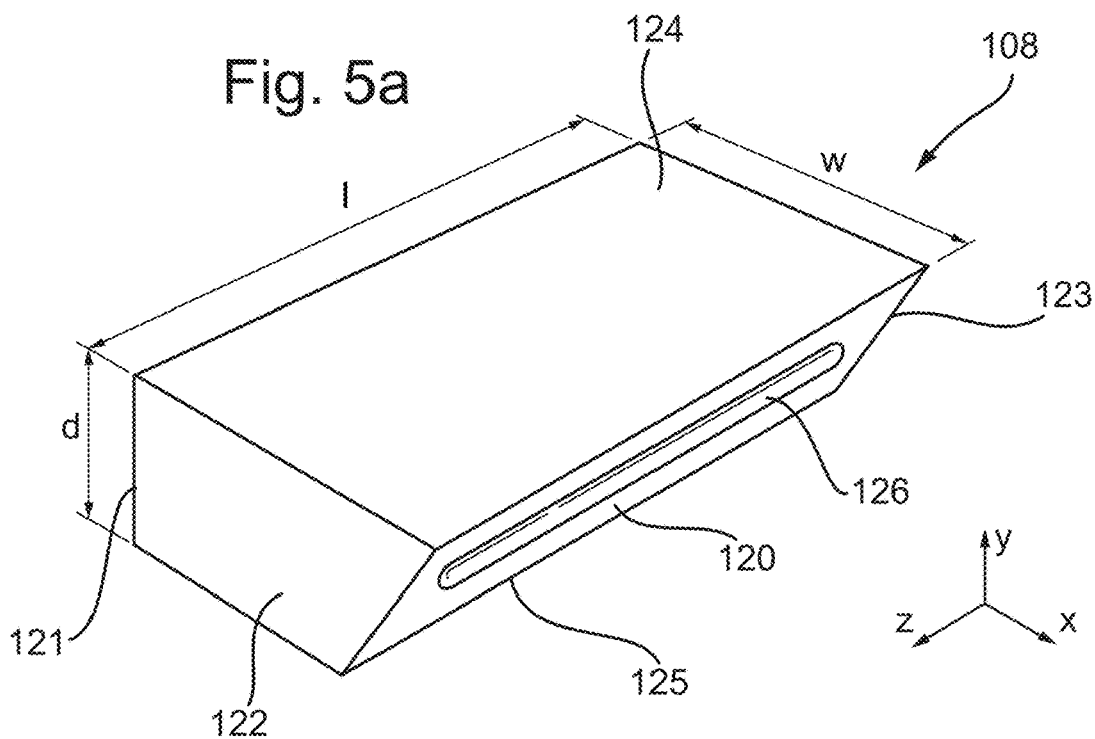
FIGS. 5a-5c show perspective views of enclosure bars for use with the curved heat exchanger of FIGS. 3 and 4.

The enclosure bars 108 of the first set 1081' of the end segment 102' are generally similar to the enclosure bars 8 of the prior art. The enclosure bars 108 of the first set 1081" of the intermediate segment 102" are shaped differently to those bars 8 of the prior art, and can be seen in more detail in FIG. 5a.

Each enclosure bar 108 of the first set 1081 comprises an inner surface 121 opposite the outer surface 120. The inner surfaces 121 of all the enclosure bars 108 of the first set 1081 are in the same general plane, which has a normal parallel to the first direction x. The inner surfaces 120 have a normal parallel to the first direction x.

Each enclosure bar 108 of the first set 1081 comprises a first end surface 122 that at least partially defines the first side 1023 of the segment 102. The first end surfaces 122 of all the enclosure bars 108 of the first set 1081 are in the same general plane, which has a normal parallel to the third direction z. The first end surfaces 122 have a normal parallel to the third direction z.

Each enclosure bar 108 of the first set 1081 comprises a second end surface 123 that at least partially defines the second side 1024 of the segment 102, and that is opposite the first end surface 122. The second end surfaces 123 of all the enclosure bars 108 of the first set 1081 are in the same general plane, which has a normal parallel to the third direction z. The second end surfaces 123 have a normal parallel to the third direction z.

Each enclosure bar 108 of the first set 1081 comprises a top surface 124 that extends between the two side surfaces 122, 123 and the inner and outer surfaces 120, 121. The top surface 124 has a normal parallel to the second direction y.

Each enclosure bar 108 of the first set 1081 comprises a bottom surface 125 that is opposite the top surface 124. The bottom surface 125 has a normal parallel to the second direction y.

The first set of enclosure bars 1081 all extend across the first end 1021 of the segment 102 from one side to another. The first set of enclosure bars 1081 all extend parallel to one another. The enclosure bars 108 of the first set 1081 are spaced from each other in the second direction y. The spaces between the enclosure bars 108 of the first set 1081 form a set of openings in the first end 1021 of the segment 102. The enclosure bars 108 of the first set 1081 are spaced by other enclosure bars 109 that extend in the first direction x. These other enclosure bars 109 are located toward the ends 122, 123 of the first set of enclosure bars 1081. Between each of the first set of enclosure bars 1081 and these other enclosure bars 109, there is a respective separating plate 105.

The enclosure bars 108 of the first set 1081 all have the same length 1 as each other. Each enclosure bar 108 has a uniform length along its width w and depth d.

The enclosure bars 108 of the first set 1081 all have the same depth d as each other. Each enclosure bar 108 has a uniform depth d along its length 1. Each enclosure bar 108 of the first set 1081' of the end segment 102' has a uniform depth d along its width w. Each enclosure bar 108 of the first set 1081" of the intermediate segment 102" has an outer portion whose depth d varies with the width w of the bar 108. This variation is described as a bevel, and more details are given below.

For the first set 1081' of the enclosure bars 108 of the end segment 102', the enclosure bars 108 all have the same width w as each other. Each enclosure bar 108 has a uniform width w along its depth d and length 1.

For the first set 1081" of the enclosure bars 108 of the intermediate segment 102", the enclosure bars 108 all have different widths w to each other. The widths w of each enclosure bar 108 of the first set 1081" increase from the bottom 103 to the top 104 of the segment 102" (see FIG. 5a). Each enclosure bar 108 has a uniform width w along its length 6. However, each bar 108 has a varying width w along its depth d (i.e. the width w of each bar 108 varies with respect to the second direction y). The width w increases from the bottom 125 to the top 124 of each enclosure bar 108. The increase in width w of each bar 108 of the first set 1081" is at the same rate, with respect to the second direction y, as the increase in width w from one bar 108 to the next of the first set 1081". This allows the outer surfaces 120 of all of the bars 108 of the first set 1081" to be in the same plane. The increase in width w of each bar 108 may be described as each bar having a bevelled outer surface 120 (see FIG. 5a). The increase in width w from one bar 108 to the next, and the bevelling of the outer surface 120 allows for the segments 102 in the curved heat exchanger 101 to be angularly offset whilst having their enclosure bars 108 join to one another.

The enclosure bars 108 of the first set 1081' of the end segment 102' (i.e. the enclosure bars 108 that do not comprise the bevelled outer surface 120) are cuboid in shape.

The enclosure bars 108 of the first set 1081" of the intermediate segment 102" (i.e. the enclosure bars 108 that do comprise the bevelled outer surface 120) are trapezoid prism-shaped, preferably a right trapezoid right prism-shaped (e.g. the end surfaces 122, 123 are shaped as trapezoids, preferably right trapezoids, and these end surfaces 122, 123 are connected by rectangular surfaces 120, 121, 124, 125).

A second set 1082 of enclosure bars 108 at least partially defines the second end 1022 of the segment 102. The second set of enclosure bars 1082 may be described as end enclosure bars.

The enclosure bars 108 of the second set of enclosure bars 1082 (of both the end segment 102' and the intermediate segment 102") are substantially identical to the enclosure bars 108 of the first set of enclosure bars 1081" of the intermediate segment 102". Thus, the enclosure bars 108 of the second set of enclosure bars 1082 of the end segment 102' and the intermediate segment 102" are substantially identical to each other.

The outer surface 120 of the enclosure bars 108 of the second set 1082 at least partially defines the second end 1022 of the segment 102. The enclosure bars 108 of the second set 1082 all extend across the second end 1022 of the segment 102 from one side to another. The spaces between the enclosure bars 108 of the second set 1082 form a set of openings in the second end 1022 of the segment.

The enclosure bars 108 of the second set 1082' of the end segment 102' (i.e. the enclosure bars 108 that do comprise the bevelled outer surface 120) are trapezoid prism-shaped, preferably a right trapezoid right prism-shaped (e.g. the end surfaces 122, 123 are shaped as trapezoids, preferably right trapezoids, and these end surfaces 122, 123 are connected by rectangular surfaces 120, 121, 124, 125).

The enclosure bars 108 of the second set 1082" of the intermediate segment 102" (i.e. the enclosure bars 108 that do comprise the bevelled outer surface 120) are trapezoid prism-shaped, preferably a right trapezoid right prism-shaped (e.g. the end surfaces 122, 123 are shaped as trapezoids, preferably right trapezoids, and these end surfaces 122, 123 are connected by rectangular surfaces 120, 121, 124, 125).

There is one enclosure bar 108 of the second set 1082 for every enclosure bar 108 of the first set 1081, each corresponding pair separating the same two separating plates 105 (or possibly the top 104 or bottom plate 103 from a separating plate 105). Thus, the pair of enclosure bars 108 and the two plates 103, 104, 105 that they separate form a second flow path 107 extending generally in the third direction z between the openings in the two sides 1023, 1024 of the heat transfer segment 102. The second flow path 107 is closed at the two ends of the segment 102 by the enclosure bars 108 of the first and second sets 1081, 1082. The plurality of enclosure bars 108 of the first set 1081, the plurality of enclosure bars 108 of the second set 1082 and the plurality of plates 103, 104, 105 form a plurality of second flow paths 107 extending from one side of the segment 102 to the other.

A third set 1091 of enclosure bars 109 at least partially defines a first side 1023 of the segment 102. The third set of enclosure bars 109 may be described as side enclosure bars. The enclosure bars 109 of the third set 1091 have a length 6 in the first direction x, a depth d in the second direction y and a width w in the third direction z.

Each enclosure bar 109 of the third set 1091 comprises an outer surface 130 that at least partially defines the first side 1023 of the segment 102. The outer surfaces 130 of all the enclosure bars 109 of the third set 1091 is in the same general plane, which has a normal parallel to the third direction z. The outer surfaces 130 all have a normal parallel to the third direction z.

Each enclosure bar 109 of the third set 1091 comprises an inner surface 131 opposite the outer surface 130. The inner surfaces 131 of all the enclosure bars 109 of the third set 1091 are in the same general plane, which has a normal parallel to the third direction z. The inner surfaces 131 all have a normal parallel to the third direction z.

Each enclosure bar 109 of the third set 1091 comprises a first end surface 132 that at least partially defines the first end 120 of the segment 102. The first end surfaces 132 of all the enclosure bars 109 of the third set 1091 are in the same general plane. In the case of the end segment 102', this plane has a normal parallel to the first direction x, and the first end surfaces 132 have a normal parallel to the first direction x. In the case of the intermediate segment 102", this plan has a normal not parallel the first direction x and the first end surfaces 132 have a normal not parallel to the first direction.

Each enclosure bar 109 of the third set 1091 comprises a second end surface 133 that at least partially defines the second end 1022 of the segment 102, and that is opposite the first end surface 132. The second end surfaces 132 of all the enclosure bars 109 of the third set 1091 are in the same general plane. In the case of both the end 102' and the intermediate 102", this plane has a normal not parallel to the first direction x and the second end surfaces 133 have a normal not parallel to the first direction x.

Each enclosure bar 109 of the third set 1091 comprises a top surface 134 that extends between the two end surfaces 132, 133 and the inner and outer surfaces 130, 131. The top surfaces 134 all have a normal parallel to the second direction y.

Each enclosure bar 109 of the third set 1091 comprises a bottom surface 135 that is opposite the top surface 134. The bottom surfaces 135 all have a normal parallel to the second direction y.

The third set of enclosure bars 1091 all extend across the first side 1023 of the segment 102 from one end to another. The third set 1091 of enclosure bars 109 all extend parallel to one another. The enclosure bars 109 of the third set 1091 are spaced from each other in the second direction y. The spaces between the enclosure bars 109 of the third set 1091 form a set of openings in the first side 1023 of the segment 102. The enclosure bars 109 of the third set 1091 are spaced by other enclosure bars 108 that extend in the third direction z. These other enclosure bars 108 are located at or toward the ends 132, 133 of the third set of enclosure bars 1091. Between each of the enclosure bars 109 of the third set 1091 and these other enclosure bars 108, there is a respective separating plate 107.

The enclosure bars 109 of the third set 1091 all have the same width as each other. Each enclosure bar 109 has a uniform width w along its length 1 and depth d.

The enclosure bars 109 of the third set 1097 all have the same depth d as each other. Each enclosure bar 109 has a uniform depth d along its width w. Each enclosure bar 109 has a substantially uniform depth d along its length 1, except at at least one end portion when the bevel (see below) is present, in which case the depth d of the end portion(s) will vary with the length 1 of the bar 109.

The enclosure bars 109 of the third set 1091 all have different lengths 1 to each other. The length 1 of each enclosure bar 109 of the third set 1091 increases from the bottom to the top of the segment 102. Each bar 109 has a varying length 1 along its depth d. The length 1 increases from the bottom to the top of each enclosure bar 109.

The increase in length 1 of each bar 109 is at the same rate as the increase in length 1 from one bar to the next. This allows the end surfaces 132, 133 of all of the bars 109 of the third set 1091 to be in the same plane. The increasing in length 1 of each bar 109 may be described as each bar having a bevelled end surface 132, 133.

The increase in length 1 of each bar 109 is at the same rate (with respect to the second direction y) as the increase in width w of the first and second sets 1081, 1082 of enclosure bars 108. This allows the end surfaces 132, 132 of all of the bars 109 of the third set 1091 to be in the same plane as the outer surfaces 120 of the first and second sets 1081, 1082 of enclosure bars 108. The bevelling of the third set 1091 is also be such that the respective end surfaces of all of the bars 109 of the third set 1091 are in the same plane as, and parallel to, the outer surfaces 120 of the first and second set 1081, 1082 of enclosure bars 108.

Figure 5B:
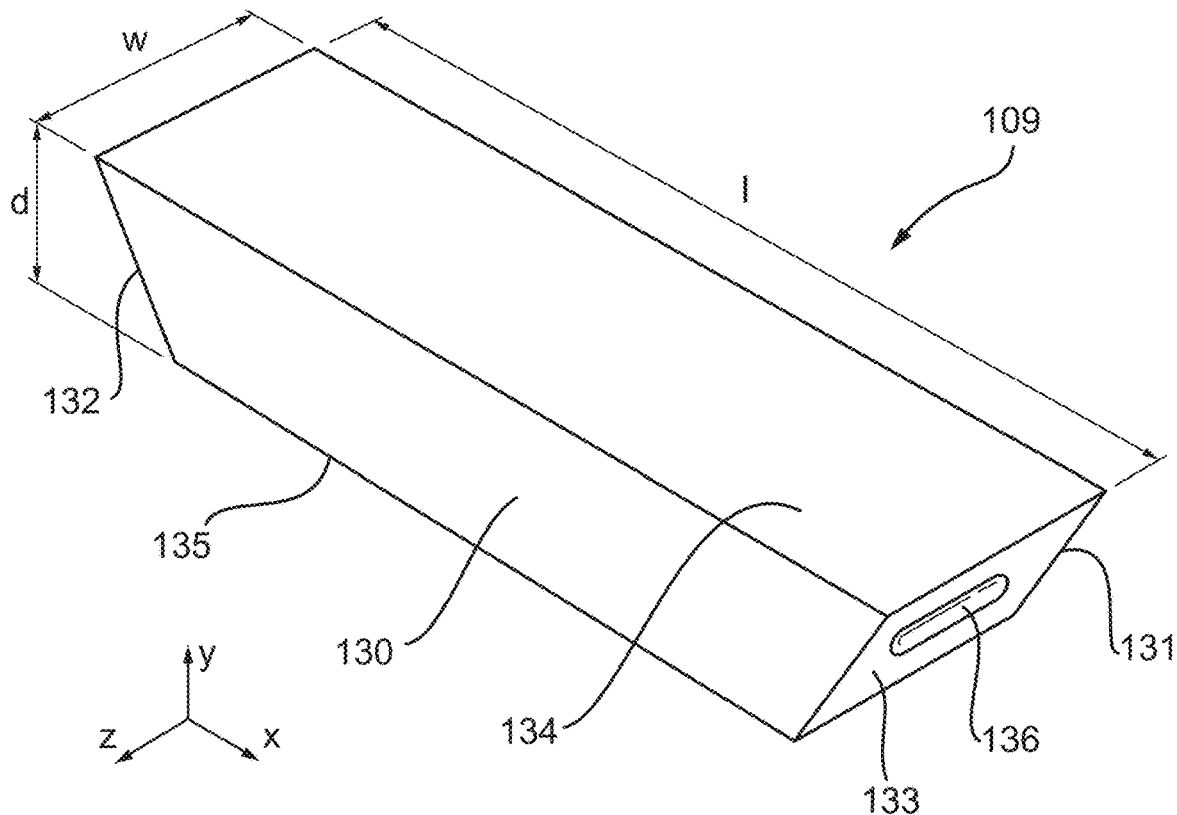
Figure 5C:
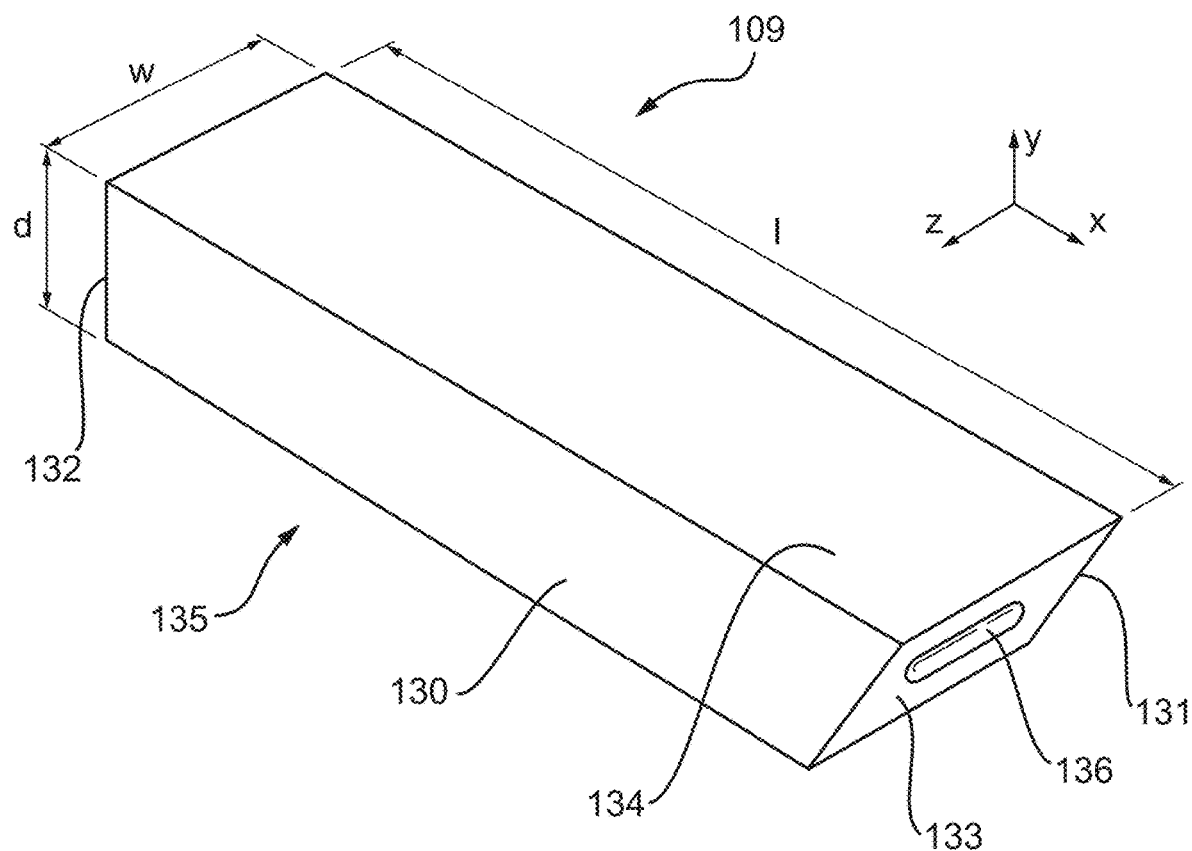

For the end segment 102', the enclosure bars 109 of the third set 1091' are shown in FIG. 5c. Only one end 133 is bevelled, the other end 132 is square. For the intermediate segment 102", the enclosure bars 109 of the third set 1091" are shown in FIG. 5b. Both ends 132, 133 are bevelled with the same bevelling angle (which is the same bevelling angle as the end 133 is FIG. 5b).

The enclosure bars 109 of the third set 1091' of the end segment 102' (i.e. the enclosure bars 109 that comprise only one bevelled end surface 133) are trapezoid prism-shaped, preferably a right trapezoid right prism-shaped (e.g. the inner and outer surfaces 130, 131 are shaped as trapezoids, preferably right trapezoids, and these end surfaces 130, 131 are connected by rectangular surfaces 132, 133, 134, 135). Such an enclosure bar is shown in FIG. 5c.

The enclosure bars 109 of the third set 1091" of the intermediate segment 102" (i.e. the enclosure bars 109 that comprise two bevelled end surfaces 132, 133) are trapezoid prism-shaped, preferably an acute trapezoid right prism-shaped, preferably isosceles trapezoid right prism-shaped (e.g. the inner and outer surfaces 130, 131 are shaped as trapezoids, preferably acute trapezoids, preferably isosceles trapezoids, and these end surfaces 130, 131 are connected by rectangular surfaces 132, 133, 134, 135). Such an enclosure bar is shown in FIG. 5b.

A fourth set of enclosure bars (not shown in FIG. 3, but the fourth set is opposite the third set 1091 in each segment 102) at least partially defines a second side 1024 of the segment 102. The fourth set of enclosure bars may be described as side enclosure bars 109.

The enclosure bars 109 of the fourth set of enclosure bars of a respective segment 102 are substantially identical to the enclosure bars 109 of the third set of enclosure bars 1091 of that segment. For instance, the enclosure bars 109 of the fourth set of enclosure bars of an end segment 102' are substantially identical to the enclosure bars 109 of the third set 1091' of that end segment (see FIG. 5c), and the enclosure bars 109 of the fourth set of an intermediate segment 102' are substantially identical to the enclosure bars 109 of the third set 1091" of that intermediate segment (see FIG. 5b).

The outer surface 130 of the enclosure bars 109 of the fourth set at least partially defines the second side 1024 of the segment 102. The enclosure bars 109 of the fourth set all extend across the second side 1024 of the segment 102 from one end to another. The spaces between the enclosure bars 109 of the fourth set form a set of openings in the second side 1024 of the segment.

The enclosure bars 109 of the fourth set of the end segment 102' (i.e. the enclosure bars 109 that comprise only one bevelled end surface 133) are trapezoid prism-shaped, preferably a right trapezoid right prism-shaped (e.g. the inner and outer surfaces 130, 131 are shaped as trapezoids, preferably right trapezoids, and these end surfaces 130, 131 are connected by rectangular surfaces 132, 133, 134, 135). Such an enclosure bar is shown in FIG. 5c.

The enclosure bars 109 of the fourth set of the intermediate segment 102" (i.e. the enclosure bars 109 that comprise two bevelled end surfaces 132, 133) are trapezoid prism-shaped, preferably acute trapezoid right prism-shaped, preferably isosceles trapezoid right prism-shaped (e.g. the inner and outer surfaces 130, 131 are shaped as trapezoids, preferably acute trapezoids, preferably isosceles trapezoids, and these end surfaces 130, 131 are connected by rectangular surfaces 132, 133, 134, 135). Such an enclosure bar is shown in FIG. 5b.

There is one enclosure bar 109 of the fourth set for every enclosure bar 109 of the third set 1091, each corresponding pair separating the same two separating plates 105 (or possibly the top 104 or bottom plate 103 from a separating plate 105). Thus, the pair of enclosure bars 109 and the two plates 103, 104, 105 that they separate form a first flow path 106 extending generally in the first direction x between the openings in the two ends 1021, 1022 of the heat transfer segment 102. The first flow path 106 is closed at the two sides 1023, 1024 of the segment 102 by the enclosure bars 109 of the third and fourth sets 1091. The plurality of enclosure bars 109 of the third set 109, the plurality of enclosure bars 109 of the fourth set and the plurality of plates 103, 104, 105 form a plurality of first flow paths 106 extending from one end of the segment 102 to the other.

The angle of the first end 132, and the increase in length 1 from one bar 109 to the next, of the third set 1091 is equal to the angle of the first end 132, and the increase in length 1 from one bar 109 to the next, of the fourth set of enclosure bars. The angle of the second end 133, and the increase in length 1 from one bar to the next, of the third set 1091 is equal to the angle of the second end 133, and the increase in length 1 from one bar 109 to the next, of the fourth set of enclosure bars.

In end segments 102', the angle of the first ends of all enclosure bars 109 of the third 1091' and fourth sets is square. In end segments 102', the bevelling angle at the second ends 133 of the third 1091' and fourth sets of enclosure bars are equal to one another. In intermediate segments 102", the bevelling angle of the first ends 132 of all enclosure bars 109 of the third 1091" and fourth sets are equal to one another. In intermediate segments 102", the bevelling angle at the second ends 133 of the third 1091" and fourth sets of enclosure bars 109 are equal to one another.

The angle of the first ends 132 of the third and fourth sets 1091 is equal to the angle of the outer surface 120 of the first set 1081 of enclosure bars. The angle of the second ends 133 of the third and fourth sets 1091 is equal to the angle of the outer surface 120 of the second set 1082 of enclosure bars.

The increase in length 1 from one bar to the next of the third and fourth sets 1091 of enclosure bars 109 corresponds to the increase in width w from one bar to the next of the first and second sets of enclosure bars 1081, 1082.

Thus, the first end 1021 of the segment 102 is defined by the outer surfaces 120 of the first set of enclosure bars 1081 and the first ends 132 of the third and fourth sets of enclosure bars 1091. The second end 1022 of the segment 102 is defined by the outer surfaces 120 of the second set of enclosure bars 1082 and the second ends 133 of the third and fourth sets of enclosure bars 1091. The first side 1023 of the segment 102 is defined by the outer surfaces 130 of the third set of enclosure bars 1091 and the first ends 122 of the first and second sets of enclosure bars 1081, 1082. The second side 1024 of the segment may be defined by the outer surfaces 130 of the fourth set of enclosure bars and the second ends 123 of the first and second sets of enclosure bars 1081, 1082.

As mentioned above, the heat transfer segment 102 comprises a plurality of separating plates 105. The separating plates 105 are planar with a normal parallel to the second direction y. The separating plates 105 extend across the segment 102 from one side 1023 to the other 1024. The separating plates 105 separate adjacent flow paths 106, 107 in the segment 102 from one another, such that fluid cannot flow between adjacent flow paths 106, 107. The separating plates 105 are rectangular in shape. The length of the separating plates may be in the first direction x, the width of the separating plates may be in the third direction z and the depth of the separating plates may be in the second direction y. The separating plates 105 are spaced from one another in the third direction by the enclosure bars 108, 109.

As discussed above, the heat transfer segment may comprise a plurality of first flow paths 106 extending in generally in the first direction x for passing fluid therethrough generally in the first direction x. The first flow paths 106 extend from one end 1021 of the heat transfer segment 102 to the other 1022. The first flow paths 106 are defined by and between the enclosure bars 109 of the third 1091 and fourth sets and the separating plates 105, and possibly the top and/or bottom plates 103, 104 for the uppermost and lowermost flow paths 106. The flow paths 106 each have an opening in the first 1021 and second ends 1022 of the heat transfer segment 102.

The heat transfer segment 102 comprises a plurality of second flow paths 107 extending generally in the third direction z for passing fluid therethrough generally in the third direction z. The second flow paths 107 extend from one side 1023 of the heat transfer segment 102 to the other 1024. The second flow paths 107 are defined by and between the enclosure bars 108 of the first and second sets 1081, 1082 and the separating plates 105, and possibly the top and/or bottom plates 103, 104 for the uppermost and lowermost flow paths. The flow paths 107 each have an opening in the first and second sides 1023, 1024 of the heat transfer segment 102.

The first 106 and second 107 flow paths are not be in fluid communication with another. Rather, they are separated by the separating plates 105 such that fluid cannot flow between a first flow path 106 and a second flow path 107.

Due to the shape and arrangement of the enclosure bars 108, 109 of the present heat transfer segment 102, when a plurality of heat transfer segments 102 are arranged in an end-to-end fashion (see FIG. 3 or 4 for example), the first flow paths 106 of one heat transfer segment 102 is in direct communication with the respective first flow paths 106 of an adjacent heat transfer segment 102. This allows, in effect, the first flow paths 106 to extend continuously through the plurality of heat transfer segments 102 without the presence of any gaps or voids as occurs in the prior art (see FIG. 2).

When in use in a heat exchanger 101, it should be appreciated that the sides 111 of the heat transfer segment may be in communication with a manifold for introducing and/or receiving the second fluid. The ends 1021 of the heat transfer segments 102' at the ends 110 of the heat exchanger 101 may be in communication with a manifold for introducing and/or receiving the first fluid.

As mentioned above, the heat transfer segment 102 comprises a plurality of heat transfer elements 112, an example of which is shown in FIG. 4. The heat transfer elements 112 are located in the first and second flow paths 106, 107. The heat transfer elements take the form of corrugated panels 112 whose peaks and troughs contact the two separating plates 105 that define a given flow path 106, 107 and whose corrugations run parallel with the flow direction of said flow path.

The heat exchanger 101 comprises two end heat transfer segments 102' that define the ends 110 of the heat exchanger 101. The heat exchanger 101 comprises two intermediate heat transfer segments 102" that connect the two end heat transfer segments 102'. The two end heat transfer segments 102" are substantially identical to each other. They may be considered to be symmetrical to each other (e.g. about their end surfaces 1021 or 1022), or just orientated 180° differently to each other. The two intermediate heat transfer segments 102" are identical to one another. The end heat transfer segments 102' are shaped as right trapezoid right prisms. The intermediate heat transfer segments 102" are shaped as isosceles trapezoid rights prisms. The angular offset between respective adjacent segments 102 is substantially the same.

The first flow paths 106 of each heat transfer segment 102 meet respective first flow paths 106 of the adjacent heat transfer segment 102, thus forming continuous first flow paths 106 from one end 110 of the curved heat exchanger to the other 110.

Figure 6:
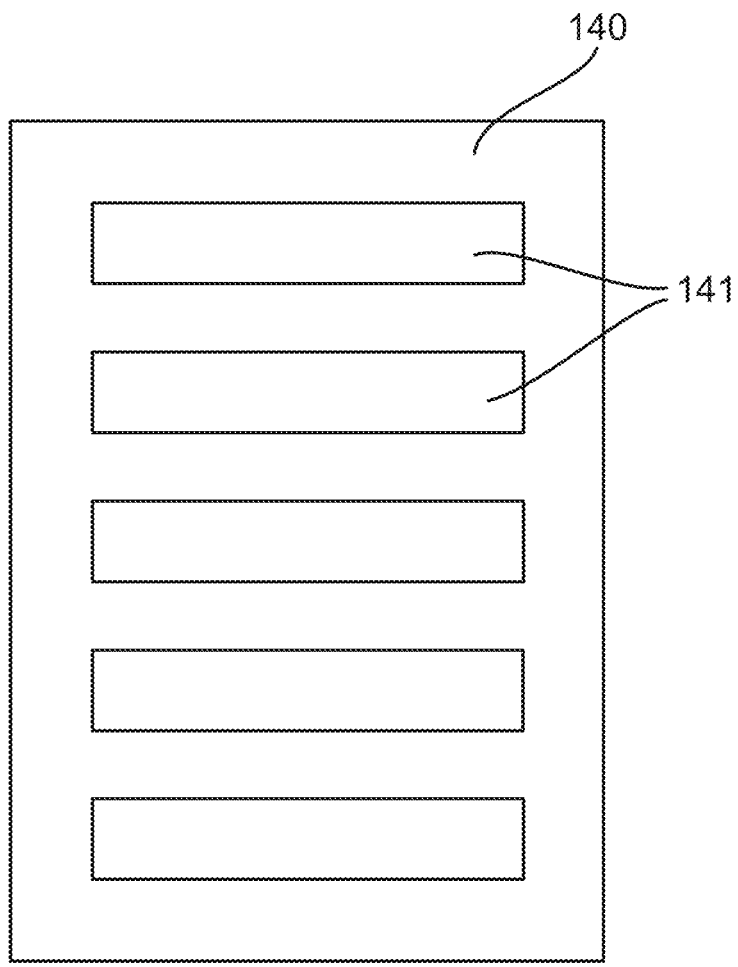
FIG. 6 shows a cut-away view of an end of an enclosure bar for use with the heat transfer segment of FIGS. 3 and 4.

With regard to FIGS. 5 and 6, some methods of manufacture of the curved heat exchanger 101 of FIGS. 3 and 4 are discussed.

Manufacturing the curved heat exchanger 101 comprises joining adjacent enclosure bars 108, 109 of adjacent segments 102 to one another. It is the surfaces 120, 132, 133 of the enclosure bars 108, 109 that define the ends 1021, 1022 of the segments that are joined to one another.

One way this is achieved (with regard to FIG. 5) is by providing the outer surface 120 of an end enclosure bar 108 that is to be joined to a corresponding outer surface 120 of an end enclosure bar of an adjacent segment 102 with a groove 126 into which a slug of brazing material may be placed and retained. The corresponding outer surface 120 of the end enclosure bar 108 of the adjacent segment may or may not also comprise such a groove 126. During manufacture, a slug of brazing material can be placed in said groove 126 prior to the segments 102 being brought adjacent one another, and the slug can then be used to braze the corresponding end enclosure bars 108 of adjacent segments 102 to each other.

Similarly, one or both of the end surfaces 132, 133 of a side enclosure bar 109 that is to be joined to a corresponding end surface 132, 133 of a side enclosure bar 109 of an adjacent segment 102 with a groove 136 into which a slug of brazing material may be placed and retained. The corresponding end surface 132, 133 of the side enclosure bar 109 of the adjacent segment 102 may or may not also comprise such a groove 136. During manufacture, a slug of brazing material can be placed in said groove 136 prior to the segments 102 being brought adjacent one another, and the slug can then be used to braze the corresponding side enclosure bars 109 of adjacent segments 102 to each other.

Additionally or alternatively, joining the adjacent enclosure bars 108, 109 of the adjacent segments 102 together comprise placing a brazing foil 140 (see FIG. 6) between said adjacent enclosure bars 108, 109 prior to joining said adjacent enclosure bars. The brazing foil 140 is shaped so as to correspond to the specific shape of the ends 1021, 1022 of the adjacent heat transfer segments 102 that have been brought adjacent to one another. The brazing foil 140 is shaped such that there are holes 141 in the bond foil to correspond to wherever there are openings in the ends 1021, 1022 of the heat transfer elements 102. The brazing foil 140 only has material where the adjacent ends 1021, 1022 of adjacent segments 102 actually contact one another.

The invention claimed is:

1. A heat transfer segment for a curved heat exchanger, wherein the heat transfer segment comprises:
   a plurality of enclosure bars that at least partially define two opposite ends of the heat transfer segment, wherein the two opposite ends define respective planes, wherein:
   the enclosure bars are shaped and arranged such that the plane of one end of the heat transfer segment is not parallel with the plane of the other end of the heat transfer segment, such that when said heat transfer segment is joined to an adjacent heat transfer segment in an end-to-end fashion, the enclosure bars of the heat transfer segment join to corresponding enclosure bars of the adjacent heat transfer segment thus forming an angular offset between the two adjacent heat transfer segments;
   wherein at least some of the enclosure bars are shaped as a trapezoid prism such that the shape of the enclosure bars allows a fluid path of the heat transfer segment to meet only a corresponding fluid path of a corresponding enclosure bar of the adjacent heat transfer segment; and
   wherein a fluid path length of each of the enclosure bars increases with distance from the bottom of the heat transfer segment such that the flow path length of each enclosure bar differs to that of the other enclosure bars on the same end of the heat transfer segment.

2. A heat transfer segment as claimed in claim 1, wherein at least one end of the heat transfer segment defines an end plane, wherein the heat transfer segment defines an end-to-end direction (x) of the heat transfer segment, and wherein a normal to said end plane is not parallel with the end-to-end direction (x).

3. A heat transfer segment as claimed in claim 1, wherein the enclosure bars each comprise a surface that at least partially defines the ends of the heat transfer segment, and wherein at least some of said surfaces comprise a groove for retaining a bonding material.

4. A heat transfer segment as claimed in claim 1, wherein the heat transfer segment is shaped as a trapezoidal prism.

5. A heat transfer segment as claimed in claim 1, comprising one or more fluid paths extending in a direction (x) from one end of the heat transfer segment to the other, wherein the enclosure bars are shaped such that when said heat transfer segment is joined to the adjacent heat transfer segment the enclosure bars meet corresponding enclosure bars of the adjacent heat transfer segment, such that said one or more fluid paths join corresponding one or more fluid paths of the adjacent heat transfer segment to form one or more continuous fluid paths through the adjacent heat transfer segments.

6. A heat transfer segment as claimed in claim 5, wherein each end of the heat transfer segment comprises a plurality of the end enclosure bars that extend across the width of the end of the heat transfer segment and a plurality of the side enclosure bars that extend in the end-to-end direction (x) of the heat transfer segment, wherein both the end and side enclosure bars are shaped and arranged such that when said heat transfer segment is joined to an adjacent heat transfer segment they meet corresponding end and side enclosure bars of the adjacent heat transfer segment.

7. A heat transfer segment as claimed in claim 1, further comprising:
   a plurality of separating plates for separating different fluid paths, wherein the separating plates are shaped such that when said heat transfer segment is joined to the adjacent heat transfer segment they meet corresponding separating plates of the adjacent heat transfer segment.

8. A heat transfer segment as claimed in claim 1, comprising one or more heat transfer elements located between the enclosure bars at at least one of the ends of the heat transfer segment.

9. A heat transfer segment as claimed in claim 1, comprising one or more first flow paths extending from one end of the segment to the other, wherein said adjacent heat transfer segment also comprises one or more first flow paths extending from one end of the segment to the other, wherein the enclosure bars are shaped and arranged such that, when said heat transfer segment is joined to said adjacent heat transfer segment in an end-to-end fashion, the one or more flow paths of the heat transfer segment meet the one or more flow paths of the adjacent segment so as to form one or more continuous flow paths through both of the segments, and such that said one or more substantially continuous flow paths have a constant cross section throughout the continuous flow path.

10. A curved heat exchanger comprising a plurality of the heat transfer segments as claimed in claim 1, wherein said heat transfer segments are joined to one another in an end-to-end fashion such that, due to said shape and arrangement of said enclosure bars, said adjacent heat transfer segments are angularly offset from one another such that said angular offset at least partially defines the curve of the curved heat exchanger.

11. A method of manufacturing a curved heat exchanger as claimed in claim 10, wherein said heat transfer segments are provided, the method comprising:

placing said heat transfer segments in an end-to-end fashion such that the enclosure bars of one of said ends of one of said heat transfer segments are adjacent to corresponding enclosure bars of one of said ends of the adjacent heat transfer segment; and joining said adjacent enclosure bars to one another using a joining process.

12. A method as claimed in claim 11, comprising placing a bond foil between said adjacent enclosure bars prior to joining said adjacent enclosure bars.

13. A method as claimed in 11, wherein the enclosure bars each comprise a surface that at least partially defines the ends of the heat transfer segment, and wherein at least some of said surfaces comprise a groove for retaining a bonding material;

further comprising placing a bonding slug in each of said grooves prior to joining said adjacent enclosure bars.

* * * * *